US011960221B2

(12) United States Patent
Tsuruga et al.

(10) Patent No.: US 11,960,221 B2
(45) **Date of Patent: *Apr. 16, 2024**

(54) IMAGE FORMING APPARATUS

(71) Applicant: CANON KABUSHIKI KAISHA, Tokyo (JP)

(72) Inventors: Ryosuke Tsuruga, Chiba (JP); Yutaka Kakehi, Chiba (JP); Tatsuya Kohno, Chiba (JP); Manato Kobayashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,149

(22) Filed: Oct. 6, 2022

(65) Prior Publication Data

US 2023/0107683 A1 Apr. 6, 2023

Related U.S. Application Data

(63) Continuation of application No. 17/347,900, filed on Jun. 15, 2021, now Pat. No. 11,500,309.

(30) Foreign Application Priority Data

Jun. 18, 2020 (JP) ................................ 2020-105702

(51) Int. Cl.
*G03G 15/16* (2006.01)

(52) U.S. Cl.
CPC ................................ *G03G 15/161* (2013.01)

(58) Field of Classification Search
CPC .................................................... G03G 15/161
See application file for complete search history.

(56) References Cited

U.S. PATENT DOCUMENTS

| | | | |
|---|---|---|---|
| 6,697,595 | B2 | 2/2004 | Kawagoe et al. |
| 8,406,658 | B2 | 3/2013 | Kaseda |
| 9,229,374 | B2 | 1/2016 | Kakehi |
| 9,348,266 | B2 | 5/2016 | Kakehi |
| 9,804,535 | B2 | 10/2017 | Kakehi |
| 9,904,214 | B2 | 2/2018 | Kakehi |
| 10,551,762 | B2 | 2/2020 | Kohno |
| 11,029,626 | B2 | 6/2021 | Torimaru et al. |
| 11,347,165 | B2 | 5/2022 | Kakehi et al. |

(Continued)

FOREIGN PATENT DOCUMENTS

| | | |
|---|---|---|
| JP | 2002-082543 A | 3/2002 |
| JP | 2011-064917 A | 3/2011 |

(Continued)

*Primary Examiner* — Stephanie E Bloss
*Assistant Examiner* — Michael A Harrison
(74) *Attorney, Agent, or Firm* — Venable LLP

(57) ABSTRACT

An image forming apparatus includes an image forming portion, a belt, a plurality of stretching rollers including an inner roller and an upstream roller, an outer member, an urging member, a first position changing mechanism, a storing portion, a controller, and an operating portion. The controller controls the first position changing mechanism on the basis of a kind of a recording material on which an image is formed, first set information stored in the storing portion, and first input information for changing setting of a position of the urging member inputted to the controller through the operating portion.

29 Claims, 18 Drawing Sheets

(56) References Cited

U.S. PATENT DOCUMENTS

| | | | | |
|---|---|---|---|---|
| 2011/0026954 | A1 | 2/2011 | Kishi | |
| 2014/0199089 | A1 | 7/2014 | Ishikawa | |
| 2015/0346645 | A1 | 12/2015 | Kakehi | |
| 2021/0397112 | A1 * | 12/2021 | Tsuruga | G03G 15/161 |

FOREIGN PATENT DOCUMENTS

| | | | |
|---|---|---|---|
| JP | 4680721 | B2 | 5/2011 |
| JP | 2014-109609 | A | 6/2014 |

* cited by examiner (a)

(b)

IMAGE FORMING APPARATUS

FIELD OF THE INVENTION AND RELATED ART

The present invention relates to an image forming apparatus, such as a copying machine, a printer, a plotter, a facsimile machine, or a multi-function machine having a plurality of functions of the foregoing machines, of an electrophotographic type or an electrostatic recording type.

Conventionally, as the image forming apparatus of the electrophotographic type, there is an image forming apparatus using an endless belt as an image bearing member for bearing a toner image. As such a belt, for example, there is an intermediary transfer belt used as a second image bearing member for feeding a sheet-like recording material such as paper from a photosensitive member or the like as a first image bearing member. In the following, principally, an image forming apparatus of an intermediary transfer type including an intermediary transfer belt will be described as an example.

In the image forming apparatus using the intermediary transfer belt, a toner image formed on the photosensitive member or the like is primary-transferred onto the intermediary transfer belt at a primary transfer portion. Then, the toner image primary-transferred on the intermediary transfer belt is secondary-transferred onto the recording material at a secondary transfer portion. By an inner member (inner secondary transfer member) provided on an inner peripheral surface side and an outer member (outer secondary transfer member) provided on an outer peripheral surface side, the secondary transfer portion (secondary transfer nip) which is a contact portion between the intermediary transfer belt and the outer member is formed. As the inner member, an inner roller (inner secondary transfer roller) which is one of a plurality of stretching rollers for stretching the intermediary transfer belt is used. As the outer member, an outer roller (outer secondary transfer roller) which is provided in a position opposing the inner roller while nipping the intermediary transfer belt between itself and the inner roller and which is pressed toward the inner roller is used in many instances. Further, a voltage of a polarity opposite to a charge polarity of toner is applied to the outer roller, (or a voltage of the same polarity as the charge polarity of the toner is applied to the inner roller) so that the toner image is secondary-transferred from the intermediary transfer belt onto the recording material in the secondary transfer portion. In general, with to respect to a feeding direction of the recording material, on a side upstream of the secondary transfer portion, a feeding guide for guiding the recording material to the secondary transfer portion is provided.

Incidentally, as regards the recording material, a "leading end" and a "trailing end" refer to the leading end and the trailing end, respectively, with respect to a recording material feeding direction.

In recent years, with diversification of the recording material in a commercial printing market, it is required that image quality specifications are satisfied in various conditions from low-rigidity thin paper to high-rigidity thick paper. Here, depending on rigidity of the recording material, behavior of the recording material changes in the neighborhood of the secondary transfer portion on sides upstream and downstream of the secondary transfer portion with respect to the recording material feeding direction and has the influence on an image which is a product in some instances.

For example, depending on the rigidity of the recording material, when the leading end or the trailing end of the recording material enters the secondary transfer portion, image defect due to vibration of the intermediary transfer belt in the neighborhood of an upstream portion of the secondary transfer portion with respect to a rotational direction of the intermediary transfer belt ("shock image" at the leading end or the trailing end of the recording material) is liable to occur in some instances. Further, for example, in the case of the "thick paper" which is an example of the recording material with high rigidity, due to the high rigidity of the recording material, a gap between the intermediary transfer belt and the recording material is liable to be formed in the neighborhood of an inlet of the secondary transfer portion. Further, by the influence of a transfer electric field, electric discharge occurs in the gap, so that the toner image scatters and thus image defect ("scattering") occurs in some instances.

Further, for example, in the case where the recording material is "thin paper" which is an example of the recording material with low rigidity, in the neighborhood of the secondary transfer portion on the side downstream of the secondary transfer portion with respect to the recording material feeding direction, the intermediary transfer belt and the recording material stick to each other, so that a jam (paper jam) occurs in some instances due to "improper separation" of the recording material from the intermediary transfer belt.

Further, in the case where the recording material is "thick paper" which is an example of the recording material with high rigidity, when a trailing end of the recording material with respect to the recording material feeding direction passes through the feeding guide, a trailing end portion (the trailing end or a region close to the trailing end) of the recording material collides with the intermediary transfer belt in some instances. By this, with respect to the recording material feeding direction, an attitude of the intermediary transfer belt in the neighborhood of the secondary transfer portion on the upstream side is disturbed, so that an image defect (by "jumping-up") such as a stripe-shaped image disturbance or the like extending in a direction substantially perpendicular to the recording material feeding direction occurs in some instances.

Therefore, a constitution in which a shape of a stretched surface of the intermediary transfer belt in the neighborhood of the secondary transfer portion and a position of the secondary transfer portion (herein these are simply referred to as also a "transfer state of the secondary transfer portion") is changed has been known.

For example, in Japanese Patent No. 4680721, a constitution in which an urging (pressing) member for suppressing the "shock image" by urging (pressing) the intermediary transfer belt from a back surface (side) of the intermediary transfer belt is provided and in which a penetration amount (entering amount) of this urging member against the intermediary transfer belt is changed depending on a thickness of the recording material has been disclosed.

Further, in a Japanese Laid-Open Patent Application (JP-A) 2002-82543, a constitution in which an urging member contacting an inner peripheral surface of the intermediary transfer belt in the neighborhood of an inlet of the secondary transfer portion is provided and in which a contact region between the intermediary transfer belt and the recording material is increased and a gap therebetween is decreased and thus the "stretching" is suppressed has been disclosed.

Further, in JP-A 2011-64917, a constitution in which a position of an outer roller is switched depending on a thickness of the recording material or information on a basis weight of the recording material and thus a position (shape) of the secondary transfer portion is changed and thus the "jumping-up" occurring at the trailing end portion of thick paper is alleviated has been disclosed.

Further, in JP-A 2014-109609, a constitution in which a position of an outer roller is changed depending on the thickness of the recording material or the like and thus a discharge angle of the recording material from the secondary transfer portion is controlled and thus a separation property of the recording material from the intermediary transfer belt is improved has been disclosed.

However, there are a wide variety of recording materials available in the market, so that a desired result of a user cannot be obtained in some cases in setting of the shape of the stretched surface of the intermediary transfer belt in the neighborhood of the inlet of the secondary transfer portion and in setting of the position of the secondary transfer portion, which are determined in advance depending on the kinds of the recording materials.

In the above, conventional problems were described taking, as an example, the secondary transfer portion which is a transfer portion of the toner image from the intermediary transfer belt onto the recording material, but there are similar problems also as to another transfer portion of the toner image from another belt-shaped image bearing member such as a photosensitive belt onto the recording material.

SUMMARY OF THE INVENTION

A principal object of the present invention is to provide an image forming apparatus capable of properly setting a shape of a stretched surface of a belt in the neighborhood of an inlet of a transfer portion in conformity to a recording material.

The object has been accomplished by the image forming apparatus according to the present invention.

According to an aspect of the present invention, there is provided an image forming apparatus comprising: an image forming portion configured to form a toner image on an image bearing member; a belt onto which the toner image is transferred from the image bearing member; a plurality of stretching rollers including an inner roller contacting an inner peripheral surface of the belt and an upstream roller provided upstream of and adjacent to the inner roller with respect to a rotational direction of the belt, the stretching rollers being configured to stretch the belt; an outer member configured to form a transfer nip, where the toner image is transferred from the belt onto a recording material, in cooperation with the inner roller in contact with an outer peripheral surface of the belt; an urging member provided downstream of the upstream roller and upstream of the inner roller with respect to the rotational direction of the belt and capable of urging the inner peripheral surface of the belt; a first position changing mechanism configured to change a position of the urging member; a storing portion configured to store first set information for setting a position of the urging member determined in advance correspondingly to a kind of the recording material; a controller configured to control the first position changing mechanism; and an operating portion provided operably by an operator and configured to permit input, to the controller, of an instruction to change setting of the position of the urging member, wherein the controller controls the first position changing mechanism on the basis of the kind of the recording material on which an image is formed, the first set information stored in the storing portion, and first input information for changing the setting of the position of the urging member inputted to the controller through the operating portion.

Further features of the present invention will become apparent from the following description of exemplary embodiments with reference to the attached drawings.

Figure 2:
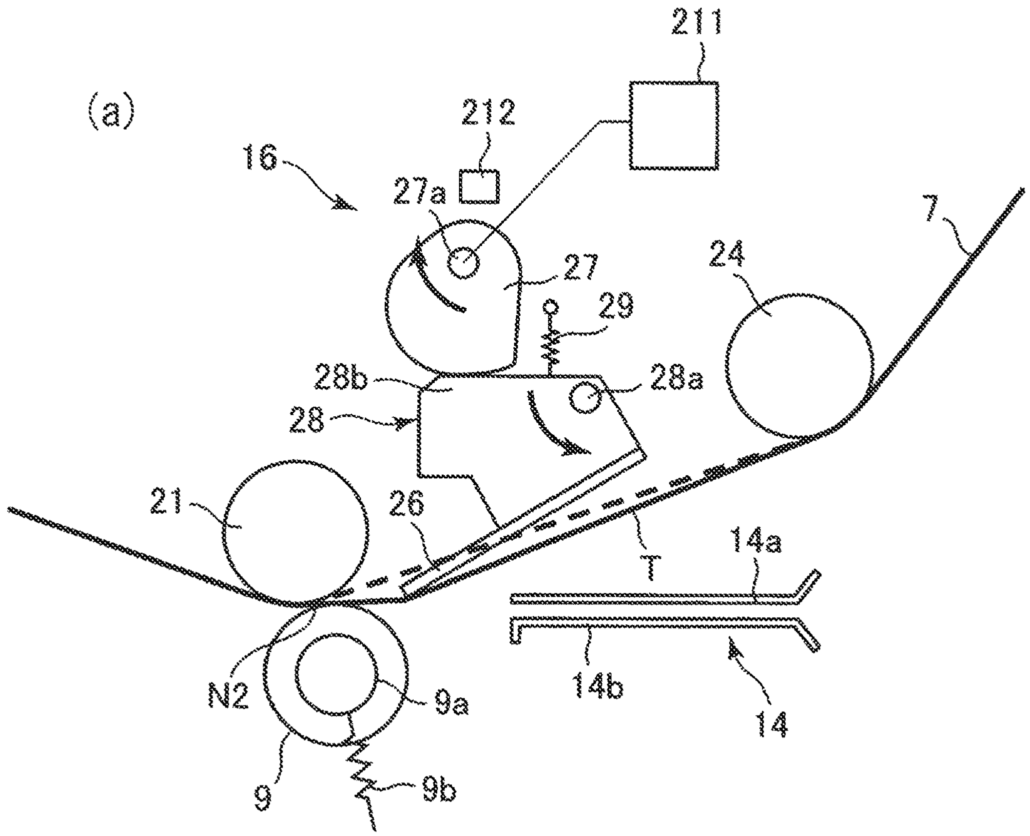
Figure 2:
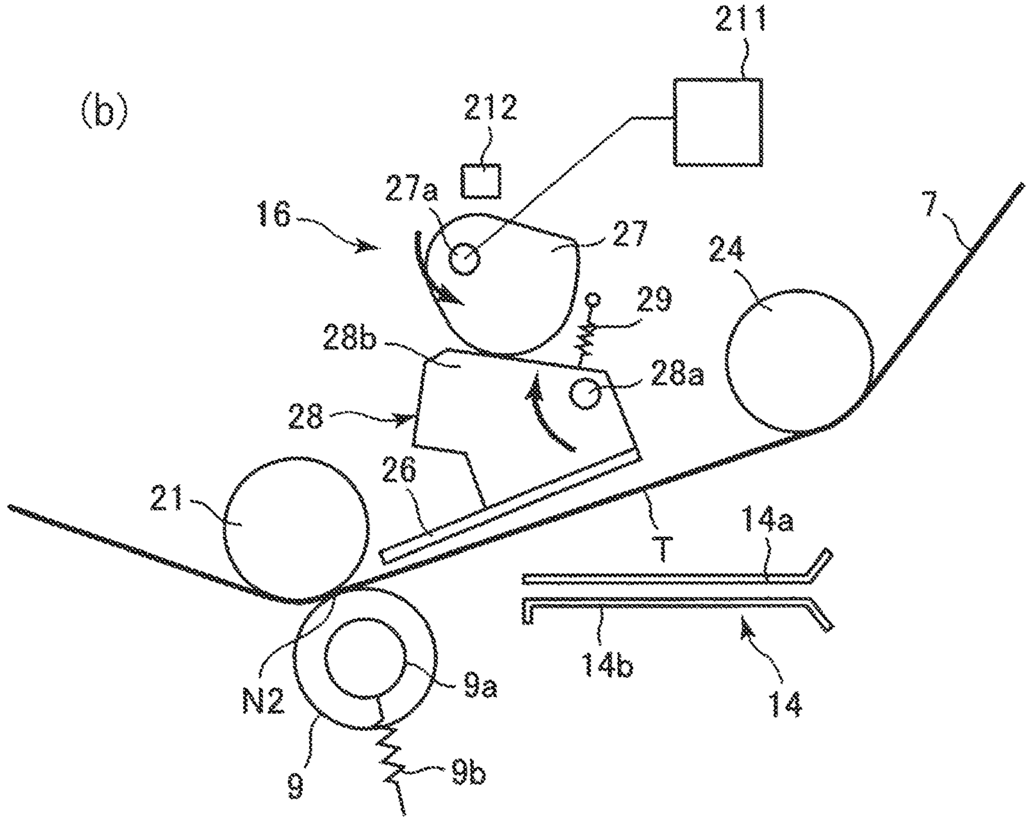

Parts (a) and (b) FIG. 2 are schematic state views showing an urging mechanism.

Figure 3:
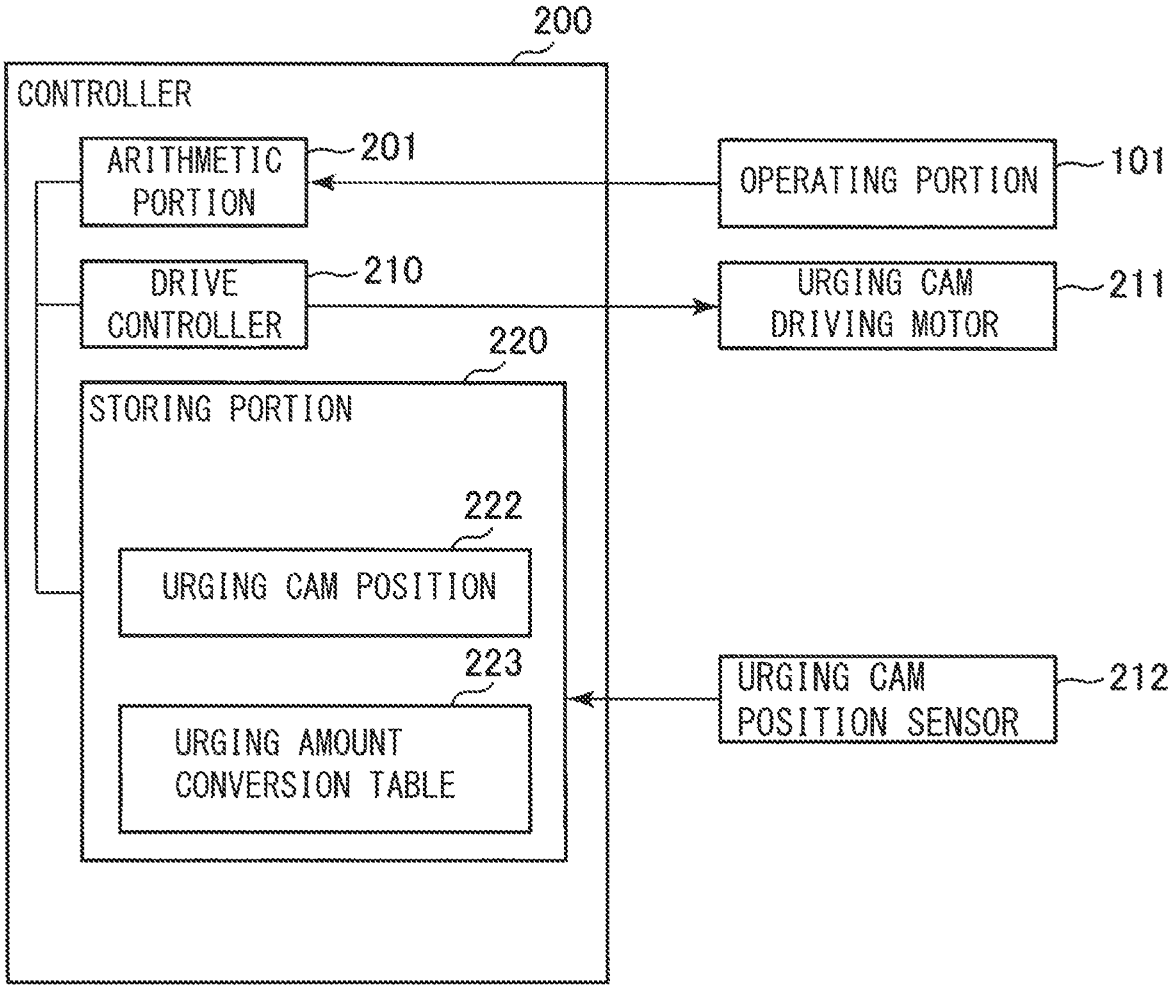

FIG. 3 is a schematic block diagram showing a control mode of a principal part of the image forming apparatus according to an embodiment 1.

Figure 4:
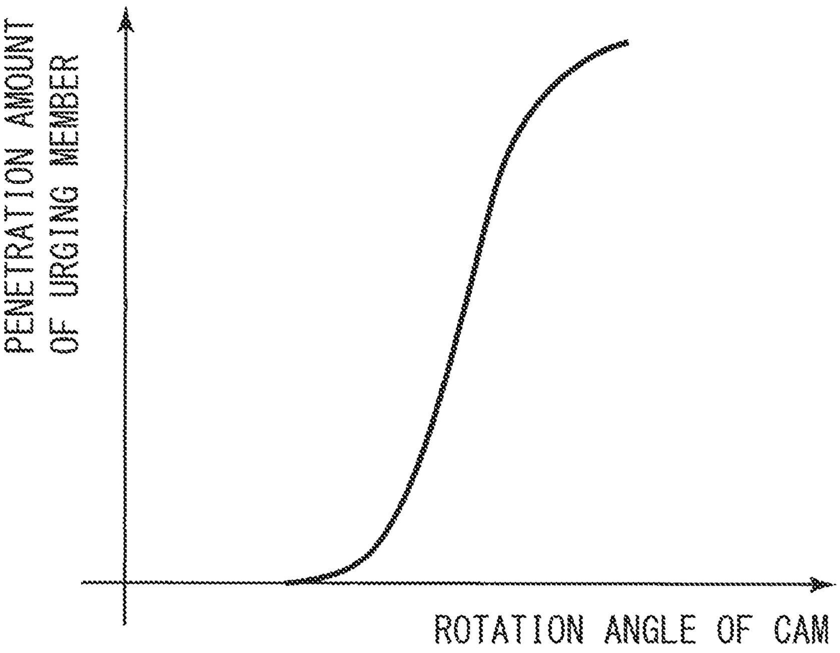

FIG. 4 is a graph showing a relationship between an angle of rotation of an urging cam and a penetration amount.

Figure 5:
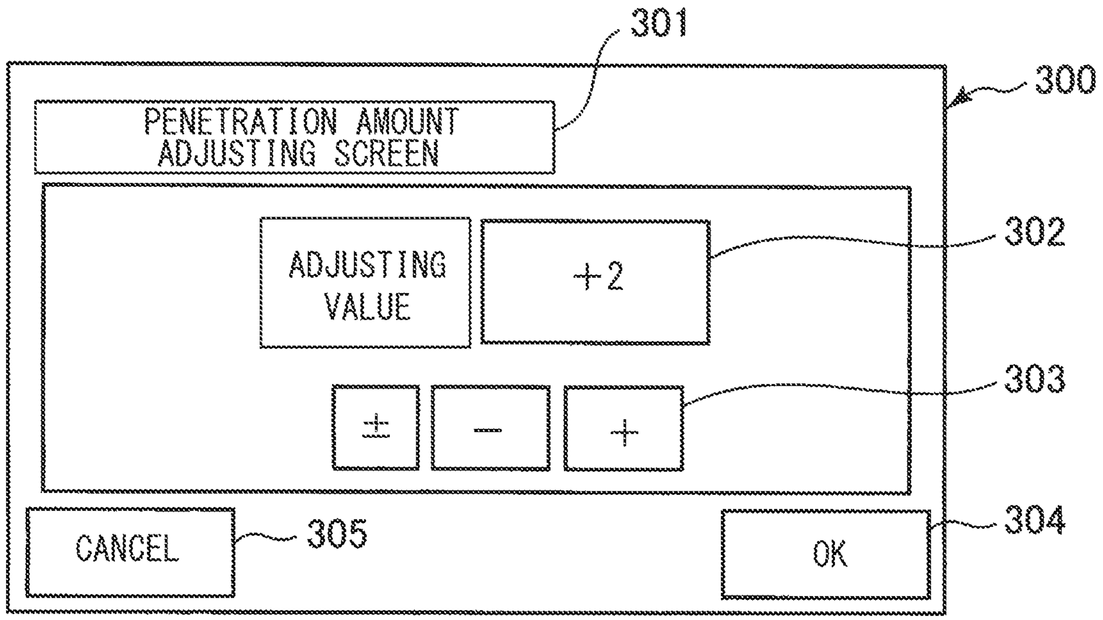

FIG. 5 is a schematic view showing an operating screen in the embodiment 1.

Figure 6:
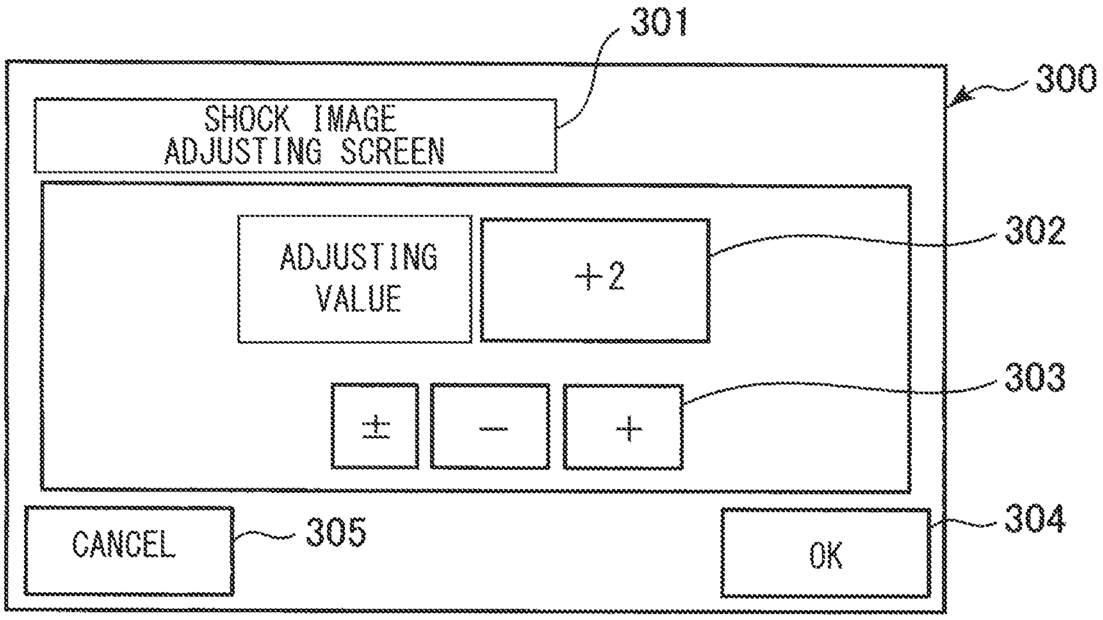

FIG. 6 is a schematic view showing another example of the operating screen in the embodiment 1.

Figure 7:
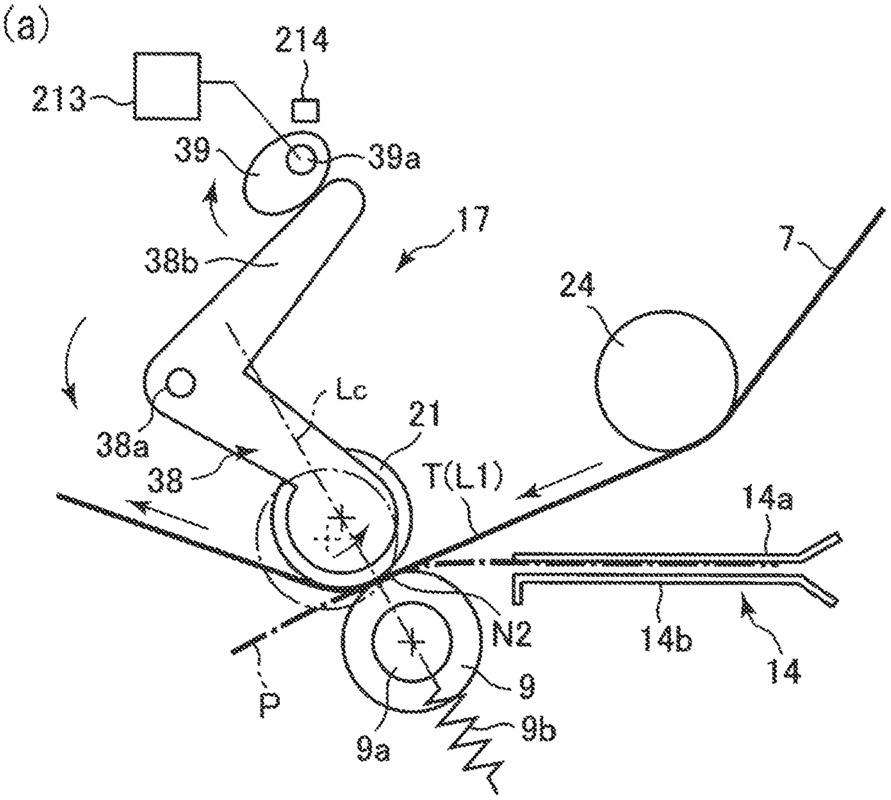
Figure 7:
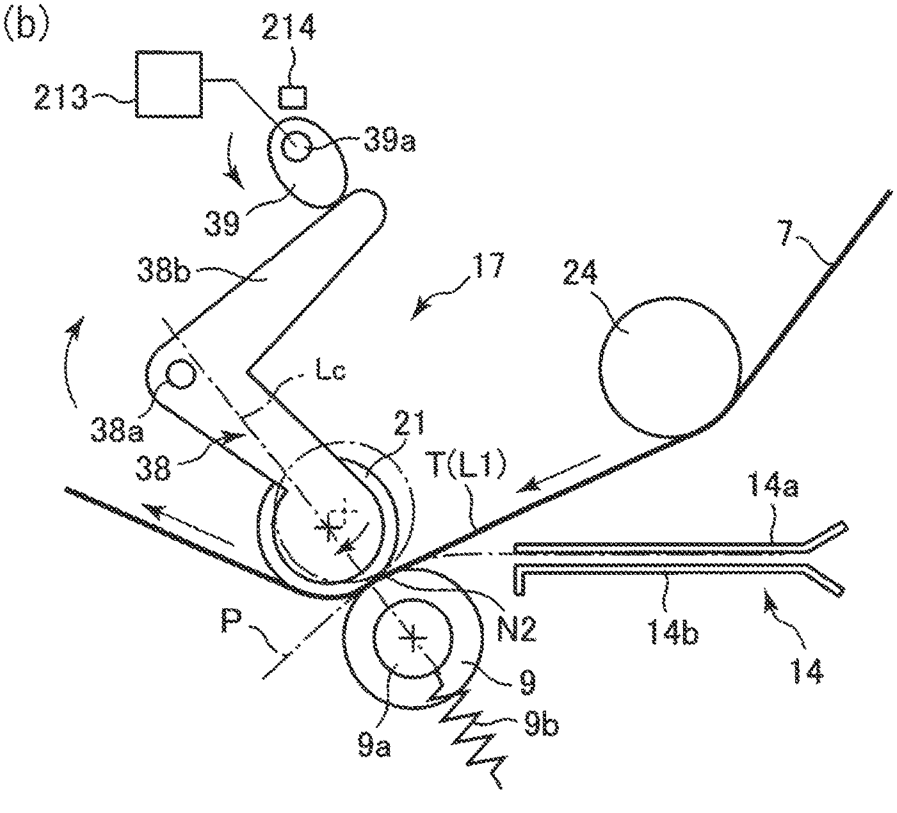

Parts (a) and (b) of FIG. 7 are schematic side views showing an offset mechanism.

Figure 8:
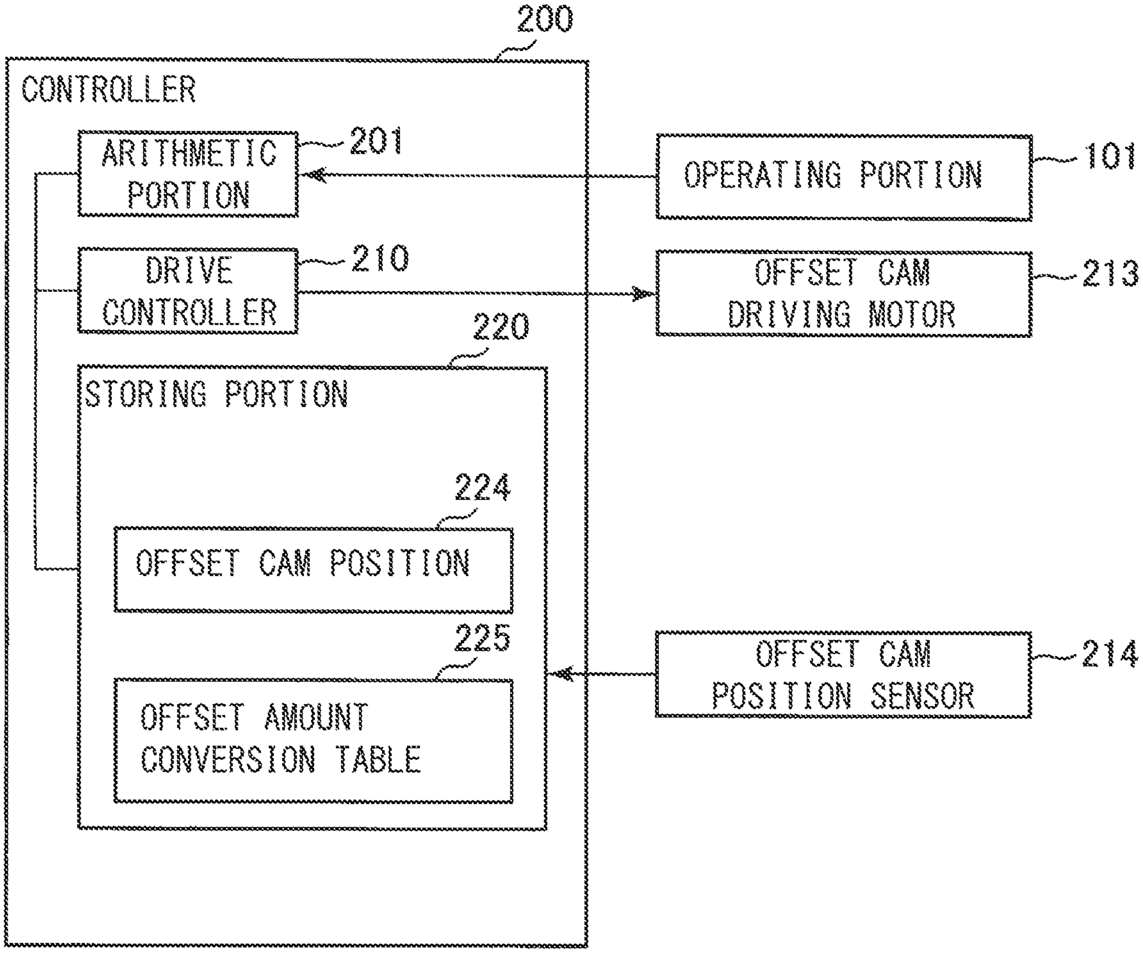

FIG. 8 is a schematic block diagram showing a control mode of a principal part of an image forming apparatus according to an embodiment 2.

Figure 9:
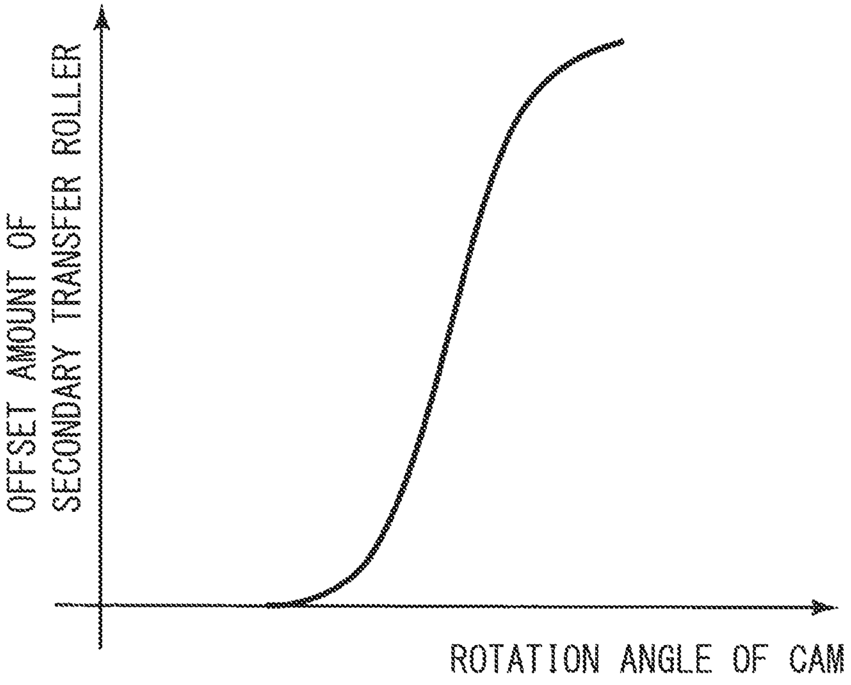

FIG. 9 is a graph showing a relationship between an angle of rotation of an offset cam and an offset amount.

Figure 10:
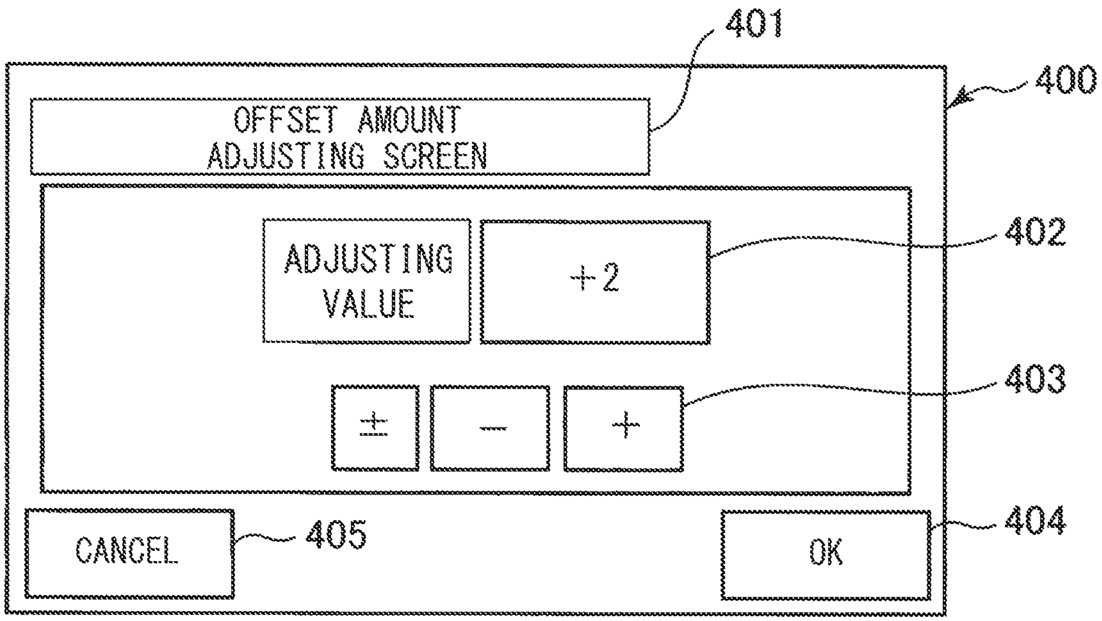

FIG. 10 is a schematic view showing an operating screen in an embodiment 2.

Figure 11:
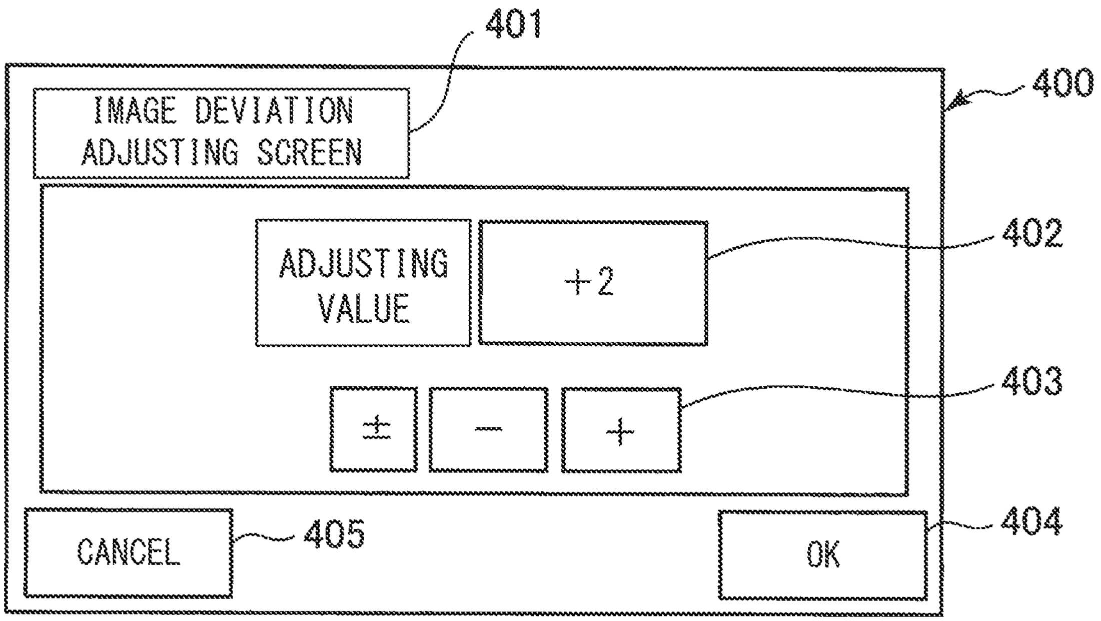

FIG. 11 is a schematic view showing another example of the operating screen in the embodiment 2.

Figure 12:
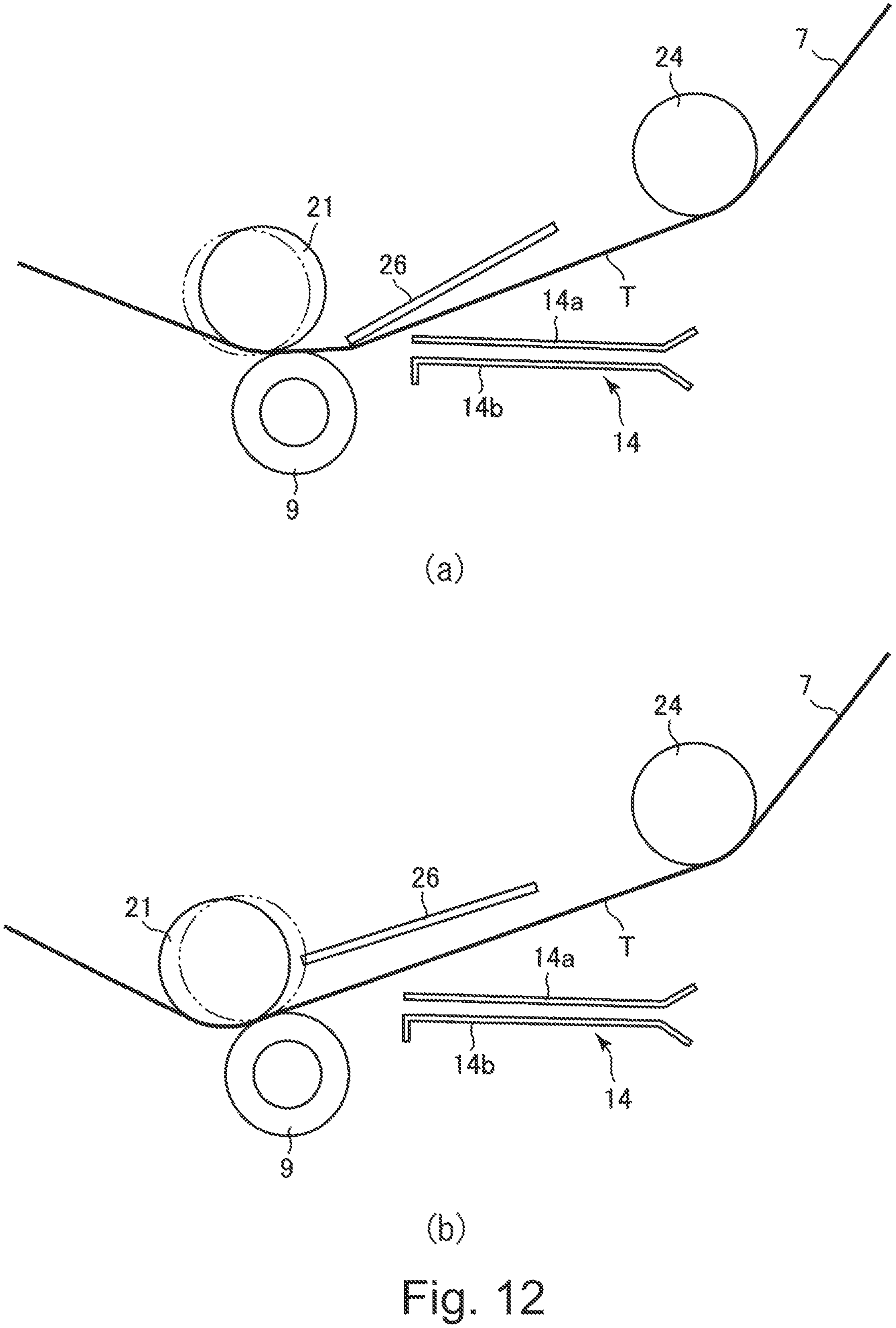

Parts (a) and (b) of FIG. 12 are schematic views each showing setting of an offset amount and a penetration amount in an embodiment 3.

Figure 13:
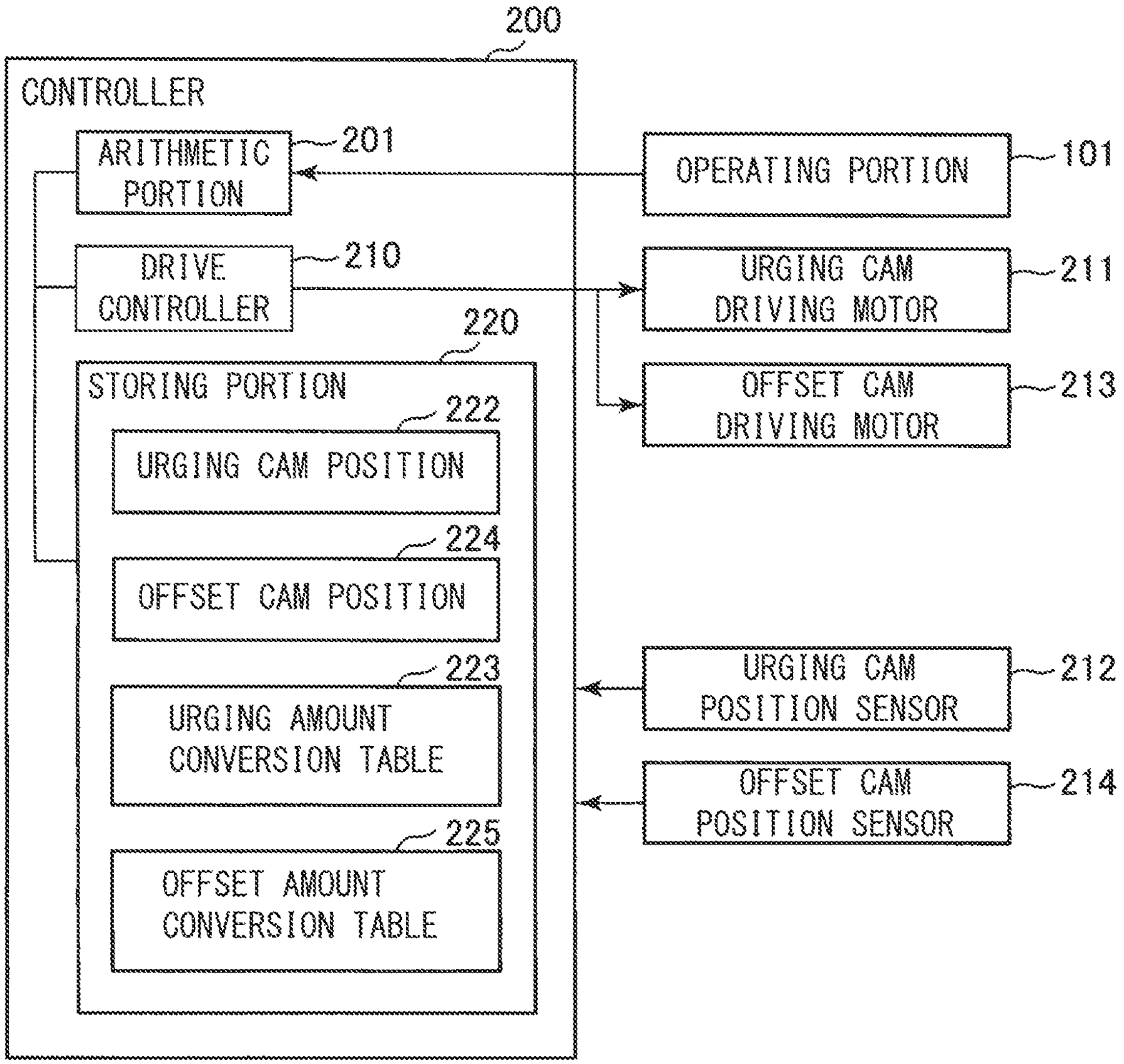

FIG. 13 is a schematic block diagram showing a control mode of a principal part of an image forming apparatus of the embodiment 3.

Figure 14:
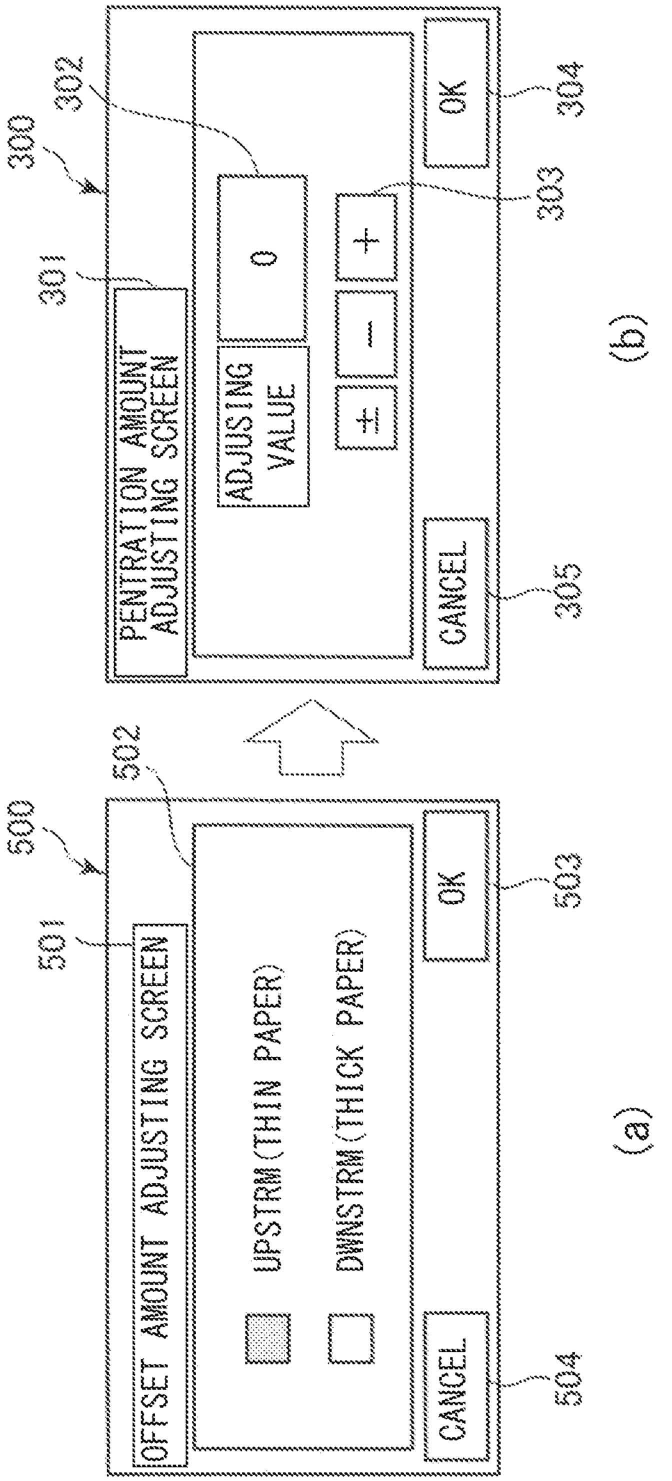

FIG. 14 is a schematic view showing an operating screen in the embodiment 3.

Figure 15:
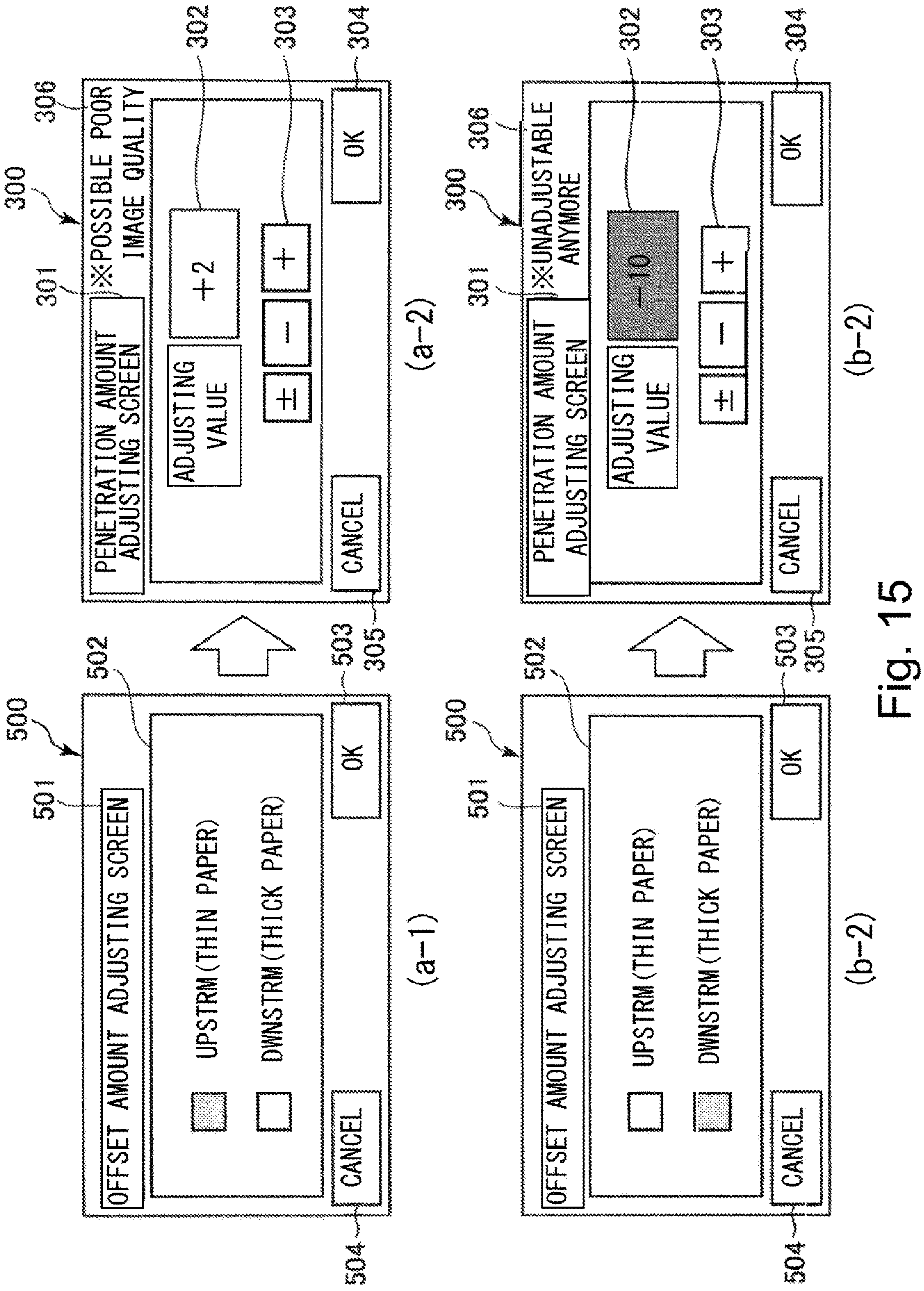

Parts (a-1), (a-2), (b-1) and (b-2) of FIG. 15 are schematic views each showing another example of the operating screen in the embodiment 3.

Figure 16:
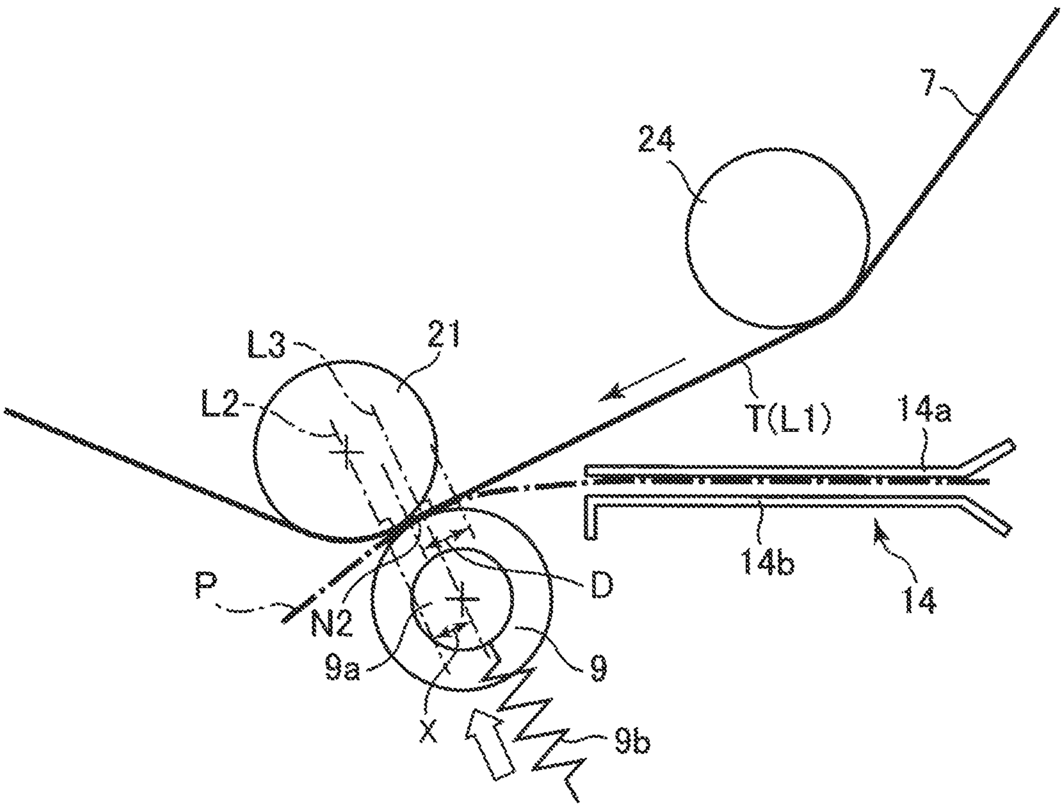

FIG. 16 is a schematic sectional view for illustrating the offset amount.

Figure 17:
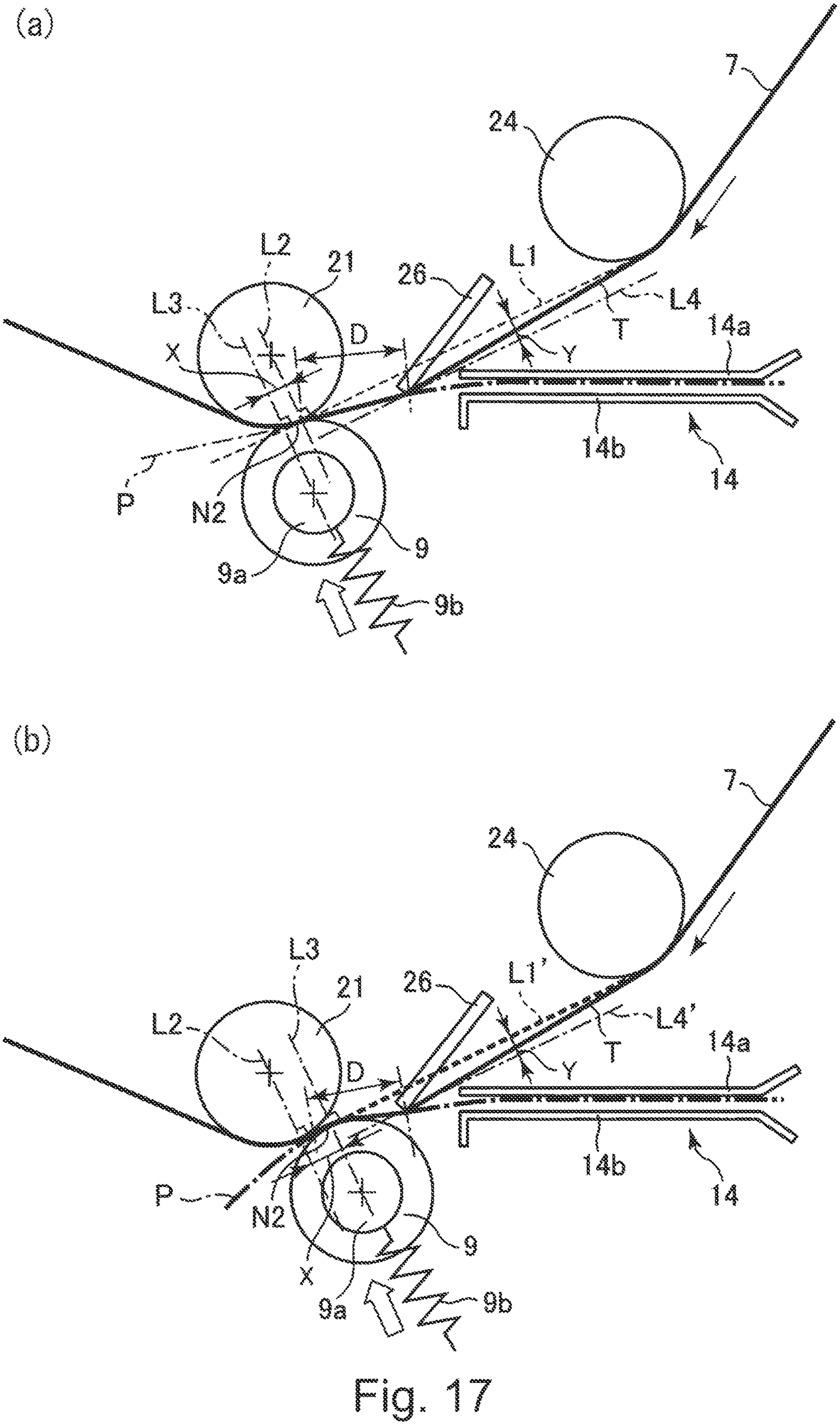

Parts (a) and (b) of FIG. 17 are schematic sectional views for illustrating the penetration amount (urging amount).

Figure 18:
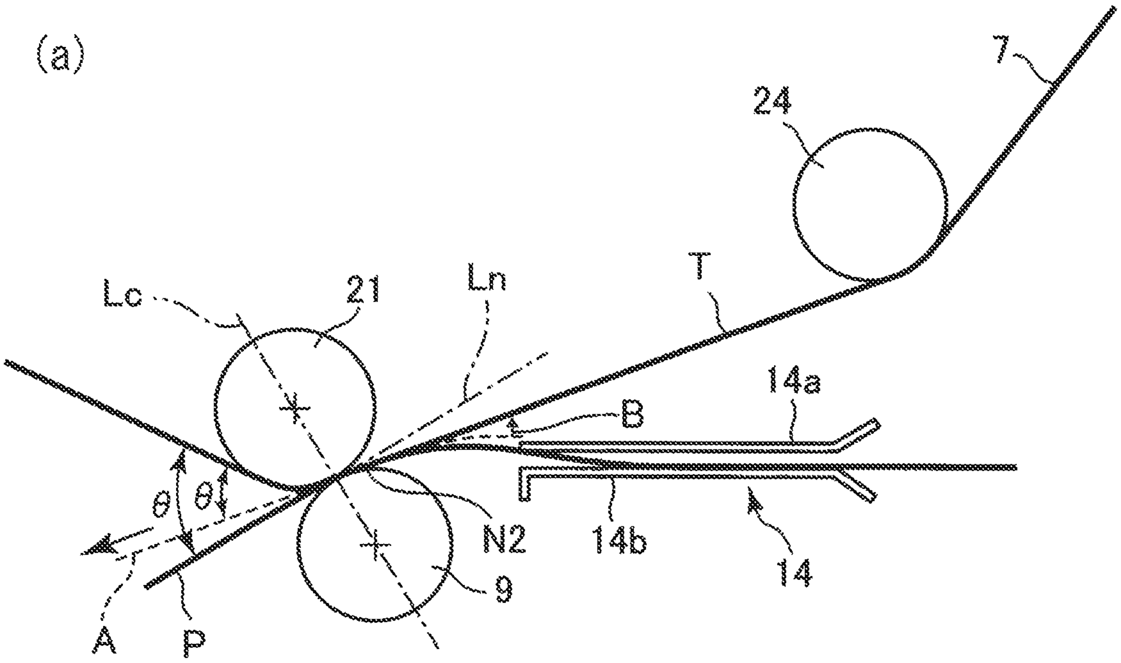
Figure 18:
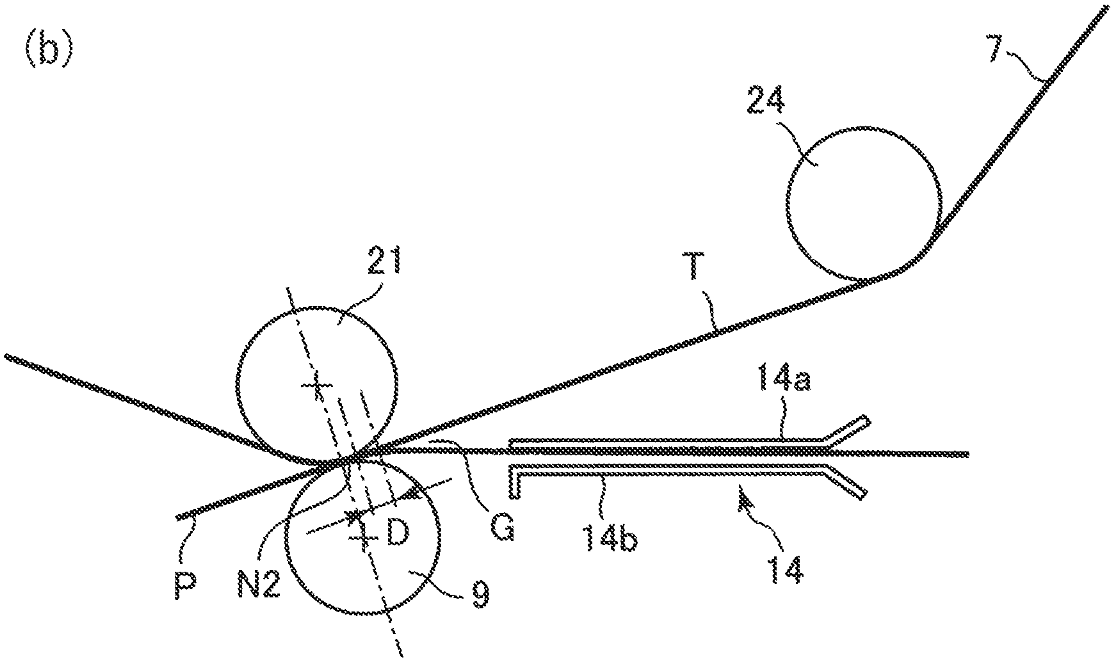

Parts (a) and (b) of FIG. 18 are schematic sectional views for illustrating a feeding attitude of a recording material.

DESCRIPTION OF THE EMBODIMENTS

In the following, an image forming apparatus according to the present invention will be specifically described with reference to the drawings.

Embodiment 1

1. General Constitution and Operation of Image Forming Apparatus

Figure 1:
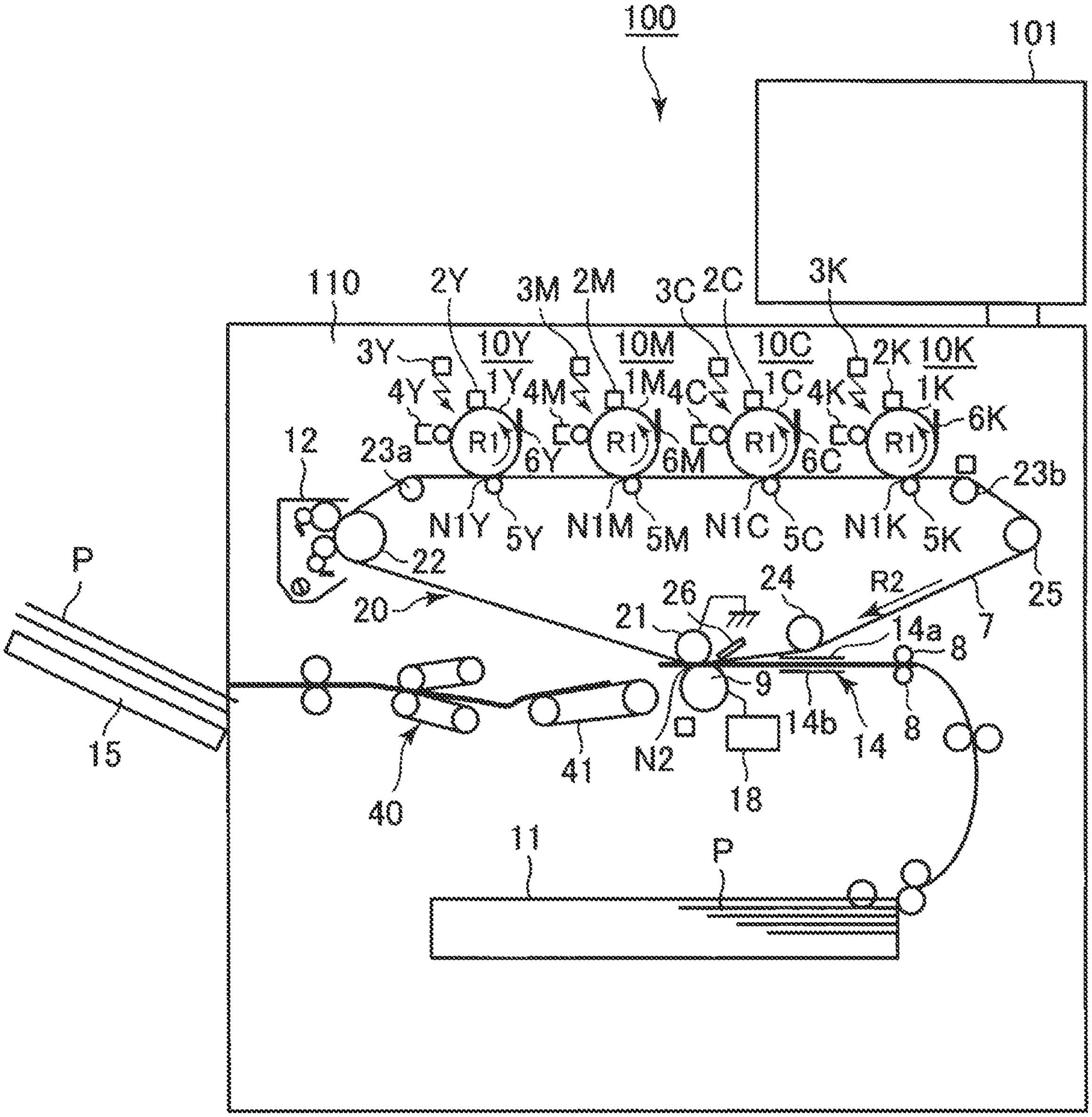
FIG. 1 is a schematic sectional view of an image forming apparatus.

FIG. 1 is a schematic sectional view of an image forming apparatus 100 of this embodiment. The image forming apparatus 100 of this embodiment is a tandem multi-function machine (having functions of a copying machine, a printer and a facsimile machine) of an intermediary transfer type. For example, in accordance with an image signal sent from an external device, the image forming apparatus 100 is capable of forming a full-color image on a sheet-like recording material (a transfer material, a sheet material, a recording medium, media) P such as paper by using an electrophotographic type process.

The image forming apparatus 100 includes, as a plurality of image forming portions (stations), four image forming portions 10Y, 10M, 10C and 10K for forming images of yellow (Y), magenta (M), cyan (C) and black (K). These image forming portions 10Y, 10M, 10C and 10K are disposed in line along a movement direction of an image transfer surface disposed substantially parallel to an intermediary transfer belt 7. As regards elements of the image forming portions 10Y, 10M, 10C and 10K having the same or corresponding functions or constitutions, suffixes Y, M, C and K for representing the elements for associated colors are omitted, and the elements will be collectively described in some instances. In this embodiment, the image forming portion 10 is constituted by including a photosensitive drum 1 (1Y, 1K, 1C, 1K), a charging device 2 (2Y, 2M, 2C, 2K), an exposure device 3 (3Y, 3M, 3C, 3K), a developing device 4 (4Y, 4M, 4C, 4K), a primary transfer roller 5 (5Y, 5M, 5C, 5K), a cleaning device 6 (6Y, 6M, 6C, 6K) and the like, which are described later.

To the photosensitive drum 1 which is a rotatable drum-shaped (cylindrical) photosensitive member (electrophotographic photosensitive member) as a first image bearing member for bearing a toner image, a driving force is transmitted from a driving motor (not shown) as a driving source, so that to the photosensitive drum 1 is rotationally driven in an arrow R1 direction (counterclockwise direction) of FIG. 1.

A surface of the rotating photosensitive drum 1 is electrically charged uniformly to a predetermined polarity (negative in this embodiment) and a predetermined potential by the charging device 2 as a charging means. During a charging process, to the charging device 2, a predetermined charging voltage is applied from a charging voltage source (not shown). The charged surface of the photosensitive drum 1 is subjected to scanning exposure to light depending on an image signal by the exposure device 3 as an exposure means (electrostatic image forming means), so that an electrostatic image (electrostatic latent image) is formed on the photosensitive drum 1. In this embodiment, the exposure device 3 is constituted by a laser scanner device for irradiating the surface of the photosensitive drum 1 with laser light modulated depending on an image signal (image information). The electrostatic image formed on the photosensitive drum 1 is developed (visualized) by supplying toner as a developer by the developing device 4 as a developing means, so that a toner image (developer image) is formed on the photosensitive drum 1. In this embodiment, the toner charged to the same polarity (negative polarity in this embodiment) as a charge polarity of the photosensitive drum 1 is deposited on an exposed portion (image portion) of the photosensitive drum 1 where an absolute value of the potential is lowered by exposing to light the surface of the photosensitive drum 1 after the photosensitive drum 1 is uniformly charged (reverse development). The developing device 4 includes a developing roller, which is a rotatable developer carrying member, for feeding the developer to a developing position which is an opposing portion to the photosensitive drum 1 while carrying the developer. The developing roller is rotationally driven by transmitting thereto a driving force from a driving system for the photosensitive drum 1, for example. Further, during development, to the developing roller, a predetermined developing voltage is applied from a developing voltage source (not shown).

As a second image bearing member for bearing the toner image, the intermediary transfer belt 7 which is a rotatable intermediary transfer member constituted by an endless belt is provided so as to oppose the four photosensitive drums 1Y, 1M, 1C and 1K. The intermediary transfer belt 7 is extended around and stretched under predetermined tension by a plurality of stretching (supporting) rollers including a driving roller 22, an upstream auxiliary roller 23*a*, a downstream auxiliary roller 23*b*, a tension roller 25, a pre-secondary transfer roller 24 and an inner roller 21. The driving roller 22 transmits a driving force to the intermediary transfer belt 7. The tension roller 24 imparts the predetermined tension to the intermediary transfer belt 7, and controls the tension of the intermediary transfer belt 7 to a certain level. The pre-secondary transfer roller 22 forms a surface of the intermediary transfer belt 7 in the neighborhood of a secondary transfer nip N2 (described later) on a side upstream of the secondary transfer nip N2 with respect to a rotational direction (surface movement direction, traveling direction) of the intermediary transfer belt 7. The inner roller (secondary transfer opposite roller, inner member) 21 functions as an opposing member (opposite electrode) of an outer roller 9 (described later). The upstream auxiliary roller 23*a* and the downstream auxiliary roller 23*b* form the image transfer surface disposed substantially horizontally. The driving roller 22 is rotationally driven by transmission of the driving force thereto from a belt driving motor (not shown) as a driving source. By this, the driving force is inputted from the driving roller 22 to the intermediary transfer belt 7, so that the intermediary transfer belt 21 is rotated (circulated and moved) in an arrow R2 direction in FIG. 1. In this embodiment, the intermediary transfer belt 7 is rotationally driven so that a peripheral speed thereof is 150-470 mm/sec. Of the plurality of stretching rollers, the stretching rollers other than the driving roller 22 are rotated by rotation of the intermediary transfer belt 7.

On the inner peripheral surface side of the intermediary transfer belt 7, the primary transfer rollers 5Y, 5M, 5C and 5K which are roller-like primary transfer members as primary transfer means are disposed correspondingly to the respective photosensitive drums 1Y, 1M, 1C and 1K. The primary transfer roller 5 is urged toward an associated photosensitive drum 1 through the intermediary transfer belt 7, whereby a primary transfer nip N1 which is a contact portion between the photosensitive drum 1 and the intermediary transfer belt 7 is formed. Further, on an inner peripheral surface side of the intermediary transfer belt 7, an urging (pressing) member 26 is provided upstream of the inner roller 21 and downstream of the pre-secondary transfer roller 24 with respect to the rotational direction of the intermediary transfer belt 7. The urging member 26 contacts an inner peripheral surface of the intermediary transfer belt 7 and is capable of urging (pressing) the intermediary transfer belt from the inner peripheral surface side toward an outer peripheral surface side. By this, the urging member 26 is capable of causing a stretched surface T (FIG. 2) of the intermediary transfer belt 7 formed between the inner roller 21 and the pre-secondary transfer roller 24 to project from the inner peripheral surface side toward the outer peripheral surface side of the intermediary transfer belt 7. The urging member 26 and an urging mechanism 16 (FIG. 2) for changing a position of this urging member 26 will be further described later.

The toner image formed on the photosensitive drum 1 as described above is primary-transferred onto the rotating intermediary transfer belt 7 at the primary nip N1 by the action of the primary transfer roller 5. During the primary transfer, to the primary transfer roller 23, a primary transfer voltage which is a DC voltage of an opposite polarity (positive in this embodiment) to a normal charge polarity (the charge polarity of the toner during the development) of the toner is applied by an unshown primary transfer voltage source. For example, during full-color image formation, the color toner images of yellow, magenta, cyan and black formed on the respective photosensitive drums 1 are successively primary-transferred superposedly onto the same image forming region of the intermediary transfer belt 7. In this embodiment, the primary transfer nip N1 is an image forming position where the toner image is formed on the intermediary transfer belt 7. The intermediary transfer belt 7 is an example of an endless belt rotatable while feeding the toner image carried in the image forming position.

On an outer peripheral surface side of the intermediary transfer belt 7, at a position opposing the inner roller 21, an outer roller (secondary transfer roller, outer member) 9 which is a roller-like secondary transfer member (rotatable transfer member) as a secondary transfer means is provided. The outer roller 9 is urged toward the inner roller 21 through the intermediary transfer belt 7 and forms the secondary transfer nip N2 as a secondary transfer portion which is a contact portion between the intermediary transfer belt 7 and the outer roller 9. The toner images formed on the intermediary transfer belt 7 as described above are secondary-transferred onto a recording material P sandwiched and fed by the intermediary transfer belt 7 and the outer roller 9 at the secondary transfer portion N2 by the action of the outer roller 9. In this embodiment, during the secondary transfer, to the outer roller 9, a secondary transfer voltage which is a DC voltage, subjected to constant-voltage control, of the opposite polarity (positive in this embodiment) to the normal charge polarity of the toner is applied by a secondary transfer voltage source (high-voltage applying means) 18. In this embodiment, for example, the secondary transfer voltage of +1 to +7 kV is applied and thus a secondary transfer current of +40 to +120 μA is caused to flow, so that the toner images are transferred from the intermediary transfer belt 7 onto the recording material P. In this embodiment, the inner roller 21 is electrically grounded (connected to the ground). Incidentally, the inner roller 21 is used as a secondary transfer member and a secondary transfer voltage of the same polarity as the normal charge polarity of the toner is applied thereto, and the outer roller 9 is used as an opposite electrode and may also be electrically grounded.

The recording material P is fed to the secondary transfer nip N2 by being timed to the toner image on the intermediary transfer belt 7. That is, the recording material P accommodated in a recording material cassette 11 as a recording material accommodating portion is fed to a pair of registration rollers (registration roller pair) 8 which is a feeding member as a feeding means and is once stopped by the registration rollers 8. Then, this recording material P is sent into the secondary transfer nip N2 by rotational drive of the registration rollers 8 so that the toner image on the intermediary transfer belt 7 coincides with a desired image forming region on the recording material P in the secondary transfer nip N2.

With respect to the feeding direction of the recording material P, a feeding guide 14 for guiding the recording material P to the secondary transfer nip N2 is provided downstream of the registration rollers pairs 8 and upstream of the secondary transfer nip N2. The feeding guide 14 is constituted by including a first guiding member **14*a* contactable to a front surface of the recording material P (i.e., a surface onto which the toner image is to be transferred immediately after the recording material P passes through the feeding guide 14) and a second guiding member 14*b* contactable to a back surface of the recording material P (i.e., a surface opposite from the front surface). The image guiding member 14*a* and the second guiding member 14*b* are disposed opposed to each other, and the recording material P passes through between these members. The first guiding member 14*a* restricts movement of the recording material P in a direction toward the intermediary transfer belt 7. The second guiding member 14*b* restricts movement of the recording material P in a direction away from the intermediary transfer belt 7**.

The recording material P on which the toner images are transferred is fed by a pre-fixing feeding device 41 toward a fixing device 40 as a fixing means. The pre-fixing feeding device 41 includes a rotatable belt member formed, at a central portion with respect to a direction substantially perpendicular to the feeding direction of the recording material P, of a rubber material such as EPDM, having a width of 100-110 mm with respect to the direction and a thickness of 1-3 mm. The pre-fixing feeding device 41 feeds the recording material P while carrying the recording material P on the belt member. This belt member is perforated with holes of 3-7 mm in diameter, and air is sucked from the inner peripheral surface side, so that a carrying force of the recording material P is enhanced and thus a feeding property of the recording material P is stabilized. The fixing device 40 heats and presses the recording material P carrying thereon unfixed toner images in a process in which the recording material P is nipped and fed by a rotatable fixing member pair and thus fixes (melts) the toner images on the surface of the recording material P. Thereafter, the recording material P on which the toner images are fixed is discharged (outputted) to a discharge tray 15 provided on an outside of an apparatus main assembly 110 of the image forming apparatus 100 by a discharging roller pair or the like which is a discharging member as a discharging means.

On the other hand, toner (primary transfer residual toner) remaining on the photosensitive drum 1 after the primary transfer is removed and collected from the surface of the photosensitive drum 1 by a cleaning device 6 as a cleaning means. Further, deposited matters such as toner (secondary transfer residual toner) remaining on the intermediary transfer belt 7 after the secondary transfer, and paper powder guided from the recording material P are removed and collected from the surface of the intermediary transfer belt 7 by a belt cleaning device 12 as an intermediary member cleaning means. In this embodiment, the belt cleaning device 12 electrostatically collects and removes the deposited matters such as the secondary transfer residual toner or the like on the intermediary transfer belt 7.

Incidentally, in this embodiment, an intermediary transfer belt unit 20 as a belt feeding device is constituted by including the intermediary transfer belt 7 stretched by the plurality of stretching rollers, the respective primary transfer rollers 5, the belt cleaning device 12, a frame supporting these members, and the like. The intermediary transfer belt unit 20 is mountable to and dismountable from the apparatus main assembly 110 for maintenance and exchange.

Here, as the intermediary transfer belt 21, a belt constituted by a resin-based material formed in a single layer structure or a multi-layer structure including an elastic layer constituted by an elastic material can be used.

Further, in this embodiment, the primary transfer roller 5 is constituted by providing an elastic layer formed with an ion-conductive foam rubber on an outer peripheral surface of a core metal (core material) made of metal. Further, in this embodiment, the primary transfer roller 5 is 15-20 mm in outer diameter and is $1\times10^5$ to $1\times10^8\Omega$ in electric resistance value in the case where the electric resistance is measured under application of a voltage of 2 kV in an environment of 23° C. and 50% RH.

Further, in this embodiment, the outer roller 9 is constituted by providing an elastic layer formed with an ion-conductive foam rubber on an outer peripheral surface of a core metal (core material) made of metal. Further, in this embodiment, the outer roller 9 is 20-25 mm in outer diameter and is $1\times10^5$ to $1\times10^8\Omega$ in electric resistance value in the case where the electric resistance is measured under application of a voltage of 2 kV in an environment of 23° C. and 50% RH. Further, in this embodiment, the outer roller 9 is rotatably supported by bearings 9*a* (FIG. 2) at opposite end portions thereof with respect to a rotational axis direction. The bearings 9*a* are slidable (movable) in a direction toward and away from the inner roller 21 and are pressed toward the inner roller 21 by urging spring 9*b* (FIG. 2) constituted by compression springs which are urging members (elastic members) as urging means. By this, the outer roller 9 contacts the intermediary transfer belt 7 toward the inner roller 21 at predetermined pressure and forms the secondary transfer nip N2. Further, in this embodiment, the inner roller 21 is constituted by providing an elastic layer formed with an electroconductive rubber on an outer peripheral surface of a core metal (core material) made of metal. Further, in this embodiment, the inner roller 21 is 20-22 mm in outer diameter and is $1\times10^5$-$1\times10^8\Omega$ in electric resistance value in the case where the electric resistance value is measured under application of a voltage of 50 V in an environment of 23° C. and 50% RH.

Incidentally, the pre-secondary transfer roller 24 may also have the same constitution as the constitution of the inner roller 24, for example.

Further, in this embodiment, rotational axis directions of the stretching rollers including the inner roller 21 for the intermediary transfer belt 7 and the outer roller 9 are substantially parallel to each other.

2. Urging Member and Urging Mechanism

Next, the urging member 26 and the urging mechanism 19 for changing the position of this urging member 26 will be described. Parts (a) and (b) of FIG. 2 are schematic side views of a principal part of a portion in the neighborhood of the secondary transfer nip N2 in this embodiment as seen from a one end portion side (front side on the drawing sheet of FIG. 1) with respect to a rotational axis direction of the inner roller 21 in a direction substantially perpendicular to the rotational axis direction. Part (a) of FIG. 2 shows a state in which the urging member 26 urges the intermediary transfer belt 7 with a predetermined urging force, and part (b) of FIG. 2 shows a state in which the urging member 26 is spaced from the intermediary transfer belt 7. In parts (a) and (b) of FIG. 2, a structure at the one end portion with respect to the rotational axis direction of the inner roller 21 is shown, but a structure at the other end portion is similar thereto (i.e., is substantially symmetrical therewith with respect to a center with respect to the rotational axis direction of the inner roller 21).

In this embodiment, the image forming apparatus 100 includes a sheet-like urging member (back-up sheet) 26. The urging member 26 is capable of causing the intermediary transfer belt 7 to project outward by urging (pressing) the inner peripheral surface of the intermediary transfer belt 7 in the neighborhood of the secondary transfer nip T2. With respect to the rotational direction of the intermediary transfer belt 7, the urging member 26 is disposed upstream of the inner roller 21 and downstream of the pre-secondary transfer roller 24 so as to be contactable to the inner peripheral surface of the intermediary transfer belt 7. Particularly, in this embodiment, with respect to the feeding direction of the recording material P, the urging member 26 is disposed so as to be contactable to the inner peripheral surface of the intermediary transfer belt 7 at a position corresponding to a position of a feeding guide 14 (first guiding member 14*a*) provided upstream of the inner roller and downstream of a free end of the feeding guide 14 on a downstream side.

The urging member 26 can be formed with a resin material. As the resin material forming the urging member 26, polyester resin or the like such as PET resin can be used suitably. In this embodiment, the urging member 26 is constituted by a plate-like member which has a predetermined length with respect to each of a longitudinal direction substantially parallel to a widthwise direction of the intermediary transfer belt 7 (substantially perpendicular to a surface movement direction of the intermediary transfer belt 7) and a short-side direction substantially perpendicular to the longitudinal direction and which has a predetermined thickness. The length of the urging member 26 with respect to the longitudinal direction is equal to the length of the intermediary transfer belt 7 with respect to the widthwise direction. The urging member 26 includes a free end portion, which is one end portion (end portion on a downstream side of the rotational direction), contactable to the inner peripheral surface of the intermediary transfer belt 7 over a substantially full width of the intermediary transfer belt 7 and capable of urging the intermediary transfer belt 7. Further, as an example, the urging member 26 is about 0.4-0.6 mm in thickness.

Here, as the urging member 26, for example, a PET resin sheet adjusted in electric resistance to a medium resistance (for example, volume resistivity of $1\times10^5$-$1\times10^9$ a cm) can be used. By this, it is possible to suppress that a current flows through the urging member 26, and it is possible to suppress that rotation of the intermediary transfer belt 7 is prevented due to attraction of the intermediary transfer belt 7 to the urging member 26 by static electricity (triboelectric charge) caused by friction between the urging member 26 and the intermediary transfer belt 7.

Incidentally, the urging member 26 is not limited to the sheet-like member made of the resin material. The urging member 26 may also be, for example, a sheet-like member constituted by a thin plate made of metal. Further, the urging member 26 is not limited to the sheet-like member. The urging member 26 may also be, for example, an elastic member (such as a pad-like elastic member) formed with a sponge, a rubber or the like. Further, the urging member 26 may also be, for example, a rigid member such as a rotatable roller made of resin, metal or the like. Further, the urging member 26 is not limited to one which is contacted to the intermediary transfer belt 7 by being disposed at a predetermined position as in this embodiment. For example, in the case where the rigid member such as the above-described rotatable roller is used as the urging member 26 or in the like case, the urging member 26 may also be urged toward the intermediary transfer belt 7 by a spring or the like as an urging means.

In this embodiment, the image forming apparatus 100 includes the urging mechanism 16 as a position changing mechanism. The urging mechanism 16 changes a position of the urging member 26 and thus changes at least one (both in this embodiment) of a penetration amount (urging amount) of the urging member 26 into the intermediary transfer belt 7 and a state in which the urging member 26 is contacted to or spaced from the intermediary transfer belt 7. Incidentally, in this embodiment, for simplicity, a change in penetration amount (urging amount) of the urging member 26 into the intermediary transfer belt 7 is described as including a change in state in which the urging member 26 is contacted to or spaced from the intermediary transfer belt 7 in some instances. Further, in this embodiment, for simplicity, a change (adjustment) in position of the urging member 26 is described simply as a change (adjustment) in penetration amount (urging amount) is some instances.

The urging member 26 is supported by an urging member holder 28 as a supporting member. The urging member 26 is fixed to the urging member holding 28 over a substantially full width thereof with respect to the longitudinal direction at a fixed end portion thereof which is one end portion (an upstream end portion with respect to the rotational direction of the intermediary transfer belt 7) with respect to the short-side direction thereof. The urging member holder 28 is held by a frame or the like of the intermediary transfer belt unit 20 so as to be rotatable about an urging member rotation shaft 28*a*. Thus, the urging member holder 28 is rotated about the urging member rotation shaft 28*a*, and thus the urging member 26 is rotated about the urging member rotation shaft 28*a*, so that the position of the urging member 26 can be changed. By this, at least one (both in this embodiment) of the penetration amount (urging amount) of the urging member 26 into the intermediary transfer belt 7 and the state in which the urging member 26 is contacted to or spaced from the intermediary transfer belt 7 can be changed.

The urging member holder 28 is constituted so as to be rotated by the action of an urging cam 27. The urging cam 27 is held by the frame or the like of the intermediary transfer belt unit 20 so as to be rotatable about an urging cam rotation shaft 27*a*. The urging cam 27 is rotated about the urging cam rotation shaft 27*a* by receiving drive from an urging cam driving motor 211 as a driving source. Further, the urging cam 27 contacts a cam follower 28*b* provided as a part of the urging member holder 28. Further, the urging member holder 28 is urged by a rotation spring 29 constituted by a tensile spring or the like which is another urging member (elastic member) as another urging means so that the cam follower 28*b* engages with the urging cam 27. In this embodiment, the image forming apparatus 100 is provided with an urging cam position sensor (cam HP sensor) 212 as a position detecting means for detecting a position of the urging cam 27 with respect to the rotational direction, particularly a home position (HP) with respect to the rotational direction. The urging cam position sensor 212 can be constituted by, for example, a flag as an indicating portion provided on or coaxially with the urging cam 27 and a photo-interrupter as a detecting portion.

Thus, in this embodiment, the urging mechanism 16 is constituted by including the urging member holder 28, the urging cam 27, the urging cam driving motor 211, the urging cam position sensor 212, the rotation spring 29, and the like.

As shown in part (a) of FIG. 2, when the intermediary transfer belt 7 is urged by the urging member 26, the urging cam 27 is rotated clockwise by being driven by the urging member driving motor 211. By this, the urging member holder 28 is rotated counterclockwise about the urging member rotation shaft 28*a*, so that a state in which the urging member 26 is disposed at a position where the penetration amount of the urging member 26 into the intermediary transfer belt 7 is predetermined penetration amount is formed. At this time, a free end of the urging member 26 contacts the inner peripheral surface of the intermediary transfer belt 7 and causes the intermediary transfer belt 7 to project outward.

Further, as shown in part (b) of FIG. 2, when the urging member 26 is spaced from the intermediary transfer belt 7, the urging cam 27 is rotated counterclockwise by being driven by the urging cam driving motor 211. By this, the urging member holder 28 is rotated clockwise about the urging member rotation shaft 28*a*, so that a state in which the urging member 26 is disposed at a position where the urging member 26 is spaced from the intermediary transfer belt 7 is formed.

As shown in part (a) of FIG. 2, when the urging member 26 contacts the intermediary transfer belt 7 and urges the intermediary transfer belt 7 with a predetermined urging force, a stretched surface T of the intermediary transfer belt 7 is changed, so that tension in the neighborhood of the secondary transfer nip N2 becomes strong. B this, vibration of the intermediary transfer belt 7 can be suppressed, so that the "shock image" at the leading end and the trailing end of the recording material P can be alleviated.

Further, in this embodiment, the urging cam 27 has a shape such that the penetration amount (urging amount) of the urging member 26 into the intermediary transfer belt 7 changes depending on an angle of rotation. By this, in this embodiment, by controlling the angle of rotation of the urging cam 27, it becomes possible to adjust the penetration amount (urging amount) of the urging member 26 into (against) the intermediary transfer belt 7. In this embodiment, a controller 200 (FIG. 3) described later controls the urging cam driving motor 211, and thus carries out control so that the urging member 26 urges the intermediary transfer belt 7 with the predetermined urging force or so that the urging member 26 is spaced from the intermediary transfer belt 7. FIG. 4 is a graph showing a relationship between the angle of rotation of the urging cam 27 and the penetration amount of the urging member 26 into the intermediary transfer belt 7 in this embodiment.

In this embodiment, an initial set value (predetermined urging force) of the urging member 26 into (against) the intermediary transfer belt 7 is set at 1.0-3.0 mm. Further, in this embodiment, the urging member 26 can be disposed at a position spaced from the intermediary transfer belt 7 or at a position where the urging member 26 contacts the intermediary transfer belt 7 with a penetration amount (urging amount) of 0-3.0 mm. Incidentally, the present invention is not limited thereto, but this penetration amount (urging amount) may suitably be about 3.5 mm or less. In the case where the penetration amount (urging amount) is larger than this value, a load exerted on a contact surface between the urging member 26 and the intermediary transfer belt 7 increases, and therefore, there is a possibility that the intermediary transfer belt 7 is not readily rotated smoothly.

Incidentally, it is desirable that the urging member 26 is moved close to the inner roller 21 to the extent possible, but the urging member 26 may desirably be disposed so as not to contact the inner roller 21. The urging member 26 can be disposed so that the inner peripheral surface of the intermediary transfer belt 7 and the free end of the urging member 26 are in contact with each other at a position, for example, about 2 mm or more, typically about 10 mm or more away from the position, where the inner roller 21 and the intermediary transfer belt 7 are in contact with each other, toward an upstream side of the rotational direction of the intermediary transfer belt 7. Further, the urging member 26 can be disposed so that the inner peripheral surface and the intermediary transfer belt 7 and the free end of the urging member 26 are in contact with each other at a position, for example, about 40 mm or less, typically about 25 mm or less away from the position, where the inner roller 21 and the intermediary transfer belt 7 are in contact with each other, toward the upstream side of the rotational direction of the intermediary transfer belt 7.

Further, the penetration amount (urging amount) of the urging member 26 into the intermediary transfer belt 7 may only be required to be a predetermined value when the recording material P passes through the neighborhood of an inlet of the secondary transfer nip N2 and the secondary transfer nip N2. The neighborhood of the inlet of the secondary transfer nip N2 is specifically a region corresponding to a region of the intermediary transfer belt 7 from a position, where the urging member 26 contacts the intermediary transfer belt 7, to the secondary transfer nip N2 with respect to the feeding direction of the recording material P.

Further, when the image forming apparatus 100 is left standing in a state in which the urging member 26 is disposed at a position where the urging member 26 urges the intermediary transfer belt 7, it causes deformation of the urging member 26 with time in some instances. For that reason, for example, in an OFF state of a main switch (power source) of the image forming apparatus 100 or in a sleep state of the image forming apparatus 100, as shown in part (b) of FIG. 2, the urging member 26 can be disposed at position where the urging member 26 is spaced from the intermediary transfer belt 7.

3. Penetration Amount and Offset Amount

The penetration amount (urging amount) of the urging member 26 into (against) the intermediary transfer belt 7 will be further described. The urging amount in which the urging member 26 is urged against the intermediary transfer belt 7 can be represented by the following penetration amount in which the urging member 26 penetrates into the intermediary transfer belt 7. This penetration amount is roughly an amount such that the urging member 26 causes the intermediary transfer belt 7 to project outward with respect to a stretched surface (stretching surface) T of the intermediary transfer belt 7 forward by stretching the intermediary transfer belt 7 by the inner roller 21 or the outer roller 9 and the pre-secondary transfer roller 24. The pre-secondary transfer roller 24 is an example of upstream rollers, of a plurality of stretching rollers, disposed adjacent to the inner roller 21 on a state upstream of the inner roller 21 with respect to the rotational direction of the intermediary transfer belt 7. This definition of the penetration amount specifically changes depending on an offset amount showing a relative position between the inner roller 21 and the outer roller 9 with respect to a circumferential direction of the inner roller 21.

First, the offset amount will be described. FIG. 16 is a schematic sectional view (cross-section substantially perpendicular to the rotational axis direction of the inner roller 21) of a portion in the neighborhood of the secondary transfer nip N2, for illustrating definition of an offset amount X indicating the relative position between the inner roller 21 and the outer roller 9.

In the cross-section shown in FIG. 16, a common tangential line of the inner roller 21 and the pre-secondary transfer roller 24 on a side where the intermediary transfer belt 7 is extended around the stretching rollers is a reference line L1. The reference line L1 corresponds to the stretched line T in the case where the urging member 26 does not cause the intermediary transfer belt 7 to project outward. Further, in the same cross section, a rectilinear line which passes through the rotation center of the inner roller 21 and which is substantially perpendicular to the reference line L1 is referred to as an inner roller center line L2. Further, in the same cross section, a rectilinear line which passes through the rotation center of the outer roller 9 and which is substantially perpendicular to the reference line L1 is referred to as an outer roller center line L3. At this time, a distance (vertical distance) between the inner roller center line L2 and the outer roller center line L3 is the offset amount X (in this case, the offset amount X is a positive value when the outer roller center line L3 is on the side upstream of the inner roller center line L2 with respect to the rotational direction of the intermediary transfer belt 7). The offset amount X can be a negative value, zero and the positive value. By making the offset amount X large, a width of the secondary transfer nip N2 with respect to the rotational direction of the intermediary transfer belt 7 extends toward an upstream side of the rotational direction of the intermediary transfer belt 7. That is, with respect to the rotational direction of the intermediary transfer belt 7, an upstream end portion of a contact region between the outer roller 9 and the intermediary transfer belt 7 is positioned on an upstream side than an upstream end portion of a contact region between the inner roller 21 and the intermediary transfer belt 7 is. Thus, by changing a position of at least one of the inner roller 21 and the outer roller 9, the relative position between the inner roller 21 and the outer roller 9 with respect to the circumferential direction of the inner roller 21 is changed, so that the position of the secondary transfer nip (transfer portion) N2 can be changed.

Next, the penetration amount will be described. Parts (a) and (b) of FIG. 17 are schematic sectional views (cross-section substantially perpendicular to the rotational axis direction of the inner roller 21) of the neighborhood of the secondary transfer nip N2, for illustrating definition of a penetration amount Y of the urging member 26 into the intermediary transfer belt 7. Incidentally, the definition of the penetration amount Y is different between the case where the offset amount X is the positive value and the case where the offset amount X is the negative value. This is because in general whether the stretched surface T of the intermediary transfer belt 7 in a state in which the intermediary transfer belt 7 is not urged by the urging member 26 is formed by the inner roller 21 and the pre-secondary transfer roller 24 or by the outer roller 9 and the pre-secondary transfer roller 24 changes depending on the offset amount X. Part (a) of FIG. 17 shows the case where the offset amount X is 0 or the negative value (particularly the negative value), and part (b) of FIG. 17 shows the case where the offset amount X is the positive value.

First, the case where the offset amount X is 0 or the negative value will be described. In the cross-section shown in part (a) of FIG. 17, the common tangential line of the inner roller 21 and the pre-secondary transfer roller 24 on the side where the intermediary transfer belt 7 is extended around the stretching rollers is the reference line L1. Further, in the same cross-section, a tangential line of the intermediary transfer belt 7 which is substantially parallel to the reference line L1 and which contacts the outer peripheral surface of the intermediary transfer belt 7 in a region where the urging member 26 contacts the intermediary transfer belt 7 is an urging portion tangential line L4. At this time, in the case where the offset amount X is 0 or the negative value, a distance (vertical distance) between the reference line L1 and the urging portion tangential line L4 is defined as the penetration amount Y of the urging member 26 into the intermediary transfer belt 7 (however, the penetration amount Y is the positive value when the urging portion tangential line L4 is on the outer peripheral surface side of the intermediary transfer belt 7 than the reference line L1 is). This penetration amount Y can be 0 or the positive value.

Next, the case where the offset amount X is 0 or the positive value will be described. In the cross-section shown in part (b) of FIG. 17, the common tangential line of the outer roller 9 and the pre-secondary transfer roller 24 on the side where the intermediary transfer belt 7 is extended around the stretching rollers is the reference line L1'. Further, in the same cross-section, a tangential line of the intermediary transfer belt 7 which is substantially parallel to the reference line L1 and which contacts the outer peripheral surface of the intermediary transfer belt 7 in a region where the urging member 26 contacts the intermediary transfer belt 7 is an urging portion tangential line L4'. At this time, in the case where the offset amount X is 0 or the positive value, a distance (vertical distance) between the reference line L1' and the urging portion tangential line L4' is defined as the penetration amount Y of the urging member 26 into the intermediary transfer belt 7 (however, the penetration amount Y is the positive value when the urging portion tangential line L4 is on the outer peripheral surface side of the intermediary transfer belt 7 than the reference line L1 is). This penetration amount Y can be 0 or the positive value.

4. Control Mode

FIG. 3 is a schematic block diagram showing a control mode of a principal part of the image forming apparatus 100 in this embodiment. The controller 200 as a control means is constituted by including a CPU as a calculation control means which is a dominant element for performing processing, memories (storing media) such as a ROM and a RAM, which are used as storing means, and an interface portion (input/output circuit) and the like. In the RAM, which is rewritable memory, information inputted to the controller 200, detected information, a calculation result and the like are stored. In the ROM, a data table acquired in advance and the like are stored. The CPU and the memories are capable of transferring and reading the data therebetween. The interface portion controls input and output (communication) of signals between the controller 200 and devices connected to the controller 200.

To the controller 200, respective portions (the image forming portions 10, the intermediary transfer belt 7, driving devices for the members relating to feeding of the recording material P, various voltage sources and the like) of the image forming apparatus 100 are connected. In a relationship with this embodiment, the controller 200 includes an arithmetic (operation) portion 201, a drive controller 210 and a storing portion 220. In this embodiment, the arithmetic portion 201 and the drive controller 210 are realized by operating the above-described CPU in accordance with associated programs. Further, in this embodiment, the storing portion 220 is realized by the above-described memory. To the drive controller 210, driving means for driving respective portions of the image forming apparatus 100, such as an urging cam driving motor 211, a drum driving motor, a belt driving motor, and the like motor are connected. By an instruction from the arithmetic portion 201, the drive controller 210 operates the driving means for driving the respective portions of the image forming apparatus 100, such as the urging cam driving motor 211 and the like.

Further, to the controller 200, the operating portion (operating panel) 101 provided on the image forming apparatus 100 is connected. The operating portion 101 includes a display portion (display means) for displaying information by control of the controller 200 and an input portion (input means) for inputting information to the controller 200 through an operation by an operator such as a user or a service person (in this embodiment, represented by the user). The operating portion 101 may be constituted by including a touch panel having functions of the display means and the input means. Further, to the controller 200, an image reading apparatus (not shown) provided in or connected to the image forming apparatus and an external device (not shown) such as a personal computer connected to the image forming apparatus 100 may also be connected.

The controller 200 causes the image forming apparatus 100 to perform the image forming operation by controlling the respective portions of the image forming apparatus 100 on the basis of information on a job. The job information includes a start instruction (start signal) and information (instruction signal) on an image formation condition such as a kind of the recording material P, which are inputted from the operating portion 101 or the external device. Further, the job information includes image information (image signals) inputted from the external device or the operating portion 101. Incidentally, information on the kind of the recording material encompasses arbitrary pieces of information capable of discriminating the recording material P, inclusive of attributes (so-called paper kind categories) based on general features such as plain paper, quality paper, coated paper, embossed paper, thick paper and thin paper, numerals and numerical ranges such as a basis weight, a thickness, a size and rigidity, and brands (including manufacturers, product numbers and the like).

Here, the image forming apparatus 100 executes a job (printing job, print job) which is a series of operations which is started by a single start instruction and in which the image is formed and outputted on a single recording material P or a plurality of recording materials P. The job includes an image forming step (image forming operation, printing operation, print operation), a pre-rotation step, a sheet (paper) interval step in the case where the images are formed on the plurality of recording materials P, and a post-rotation step in general. The image forming step is performed in a period in which formation of an electrostatic image for the image actually formed and outputted on the recording material P, formation of the toner image, primary transfer of the toner image and secondary transfer of the toner image are carried out. Specifically, timing during the image formation is different among positions where the respective steps of the formation of the electrostatic image, the toner image formation, the primary transfer of the toner image and the secondary transfer of the toner image are performed. The pre-rotation step is performed in a period in which a preparatory operation, before the image forming step, from an input of the start instruction until the image is started to be actually formed. The sheet interval step is performed in a period corresponding to an interval between a recording material P and a subsequent recording material P when the images are continuously formed on a plurality of recording materials P (continuous image formation). The post-rotation step is performed in a period in which a post-operation (preparatory operation) after the image forming step is performed. During non-image formation (non-image formation period) is a period other than the period of the image formation and includes the periods of the pre-rotation step, the sheet interval step, the post-rotation step and further includes a period of a pre-multi-rotation step which is a preparatory operation during turning-on of a main switch (voltage source) of the image forming apparatus 100 or during restoration from a sleep state. Incidentally, the sleep state (rest state) is, for example, a state in which supply of electric power to the respective portions of the image forming apparatus 100, other than the controller 200 (or a part thereof), is stopped and electric power consumption is made smaller than electric power consumption in a stand-by state, a main switch of the image forming apparatus 100 is turned on and the image forming apparatus 100 stands by for the job. In this embodiment, during the non-image formation, typically in the stand-by state, the image forming apparatus 100 is capable of performing an operation for adjusting the penetration amount Y.

5. Adjustment of Position of Urging Member

In general, by increasing the penetration amount Y, it is possible to further suppress the vibration of the intermediary transfer belt 7, and therefore, it can be said that the increased penetration amount Y is advantageous for alleviating the "shock image" at the leading end and the trailing end of the recording material P. However, when the penetration amount Y is excessively increased, the toner and the recording material P rub with each other strongly before the recording material P enters a region where the toner is electrically transferred onto the recording material P, so that a deviation amount of the toner image becomes large in some instances.

Thus, for example, the "shock image" at the leading end and the trailing end of the recording material P and the "toner image deviation" provide a contradictory relationship with respect to the penetration amount Y. Further, the "shock image" at the leading end and the trailing end of the recording material P and the "toner image deviation" are also largely influenced by a characteristic of the recording material P. However, the recording materials P available in the market and diversified, and therefore, it is desired that depending on the recording material P actually used by the user, the penetration amount Y is finely adjusted and thus meets various characteristic of the recording material P, such as thickness, rigidity and a surface property. Further, a degree of an occurrence of image defect is difference also depending on an image to be formed, so that it is also effective that the penetration amount Y can be finely adjusted depending on the image to be formed.

Therefore, in this embodiment, as regards the image forming apparatus 100, the user is capable of arbitrarily adjusting the penetration amount Y. By this, the user is capable of adjusting the penetration amount Y to a penetration amount Y corresponding to the recording material P actually used or the image to be formed.

Next, an adjusting method of the penetration amount Y (position of the urging member 26) in this embodiment will be specifically described.

As shown in FIG. 3, in this embodiment, in the storing portion 220, urging cam position information 222 acquired from the urging cam position sensor 212 for detecting the home position (HP) of the urging cam 27 is stored. Further, in this embodiment, in the storing portion 220, an urging amount conversion table 223 for rotationally driving the urging cam 27 to a predetermined position is stored.

The urging amount conversion table 223 shows a relationship between the angle of rotation of the urging cam 27 and the penetration amount Y as shown in FIG. 4. On the basis of the urging amount conversion table 223 and the urging cam position information 222, the arithmetic portion 201 acquires the angle of rotation of the urging cam 27 necessary to adjust the penetration amount Y to a predetermined penetration amount Y. Then, depending on a result thereof, the urging cam 27 is rotated by operating the urging cam driving motor 211 by a necessary control amount by the drive controller 210.

In this embodiment, the user provides an instruction from an input portion of the operating portion 101 to the controller 200 so as to adjust the penetration amount Y. A specific operating screen in the operating portion 101 will be described later. Further, the arithmetic portion 201 of the controller 200 reflects information on the penetration amount Y designated by the user through the input portion of the operating portion 101 in an operation of the urging cam driving motor 211. Incidentally, in this embodiment, the adjustment of the penetration amount Y is instructed through the operating portion 101, but can also be instructed from the external device communicatably connected to the image forming apparatus 100. In this case, the above-described interface portion (input/output circuit) and the like function as the input portion.

6. Operating Screen

Next, an instructing method of adjustment of the penetration amount Y from the operating portion 101 in this embodiment will be described.

FIG. 5 is a schematic view showing an operating screen 300 constituting an input portion for providing an instruction to adjust the penetration amount Y displayed on the operating portion 101. In this embodiment, the operating portion 101 is constituted by including a touch panel, and the operating screen 300 is displayed on this touch panel. The operating screen 300 is displayed on the operating portion 101 by control of the controller 200 through a predetermined operation by the user on a main screen (not shown) displayed on the operating portion 101. Further, the user operates (touches) a predetermined button displayed on the operating screen 300, so that a predetermined signal associated with this button is inputted from the operating portion to the controller 200.

On the operating screen 300, an adjusting item display portion 301 is provided. In this embodiment, at the adjusting item display portion 301, an adjusting item is displayed by direct expression showing an adjusting portion in the image forming apparatus 100. For example, in this embodiment, an "URGING MEMBER PENETRATION AMOUNT ADJUSTING SCREEN" is displayed.

Further, on the operating screen 300, an adjusting value display portion 302 and an adjusting value input portion 303 are provided. At the adjusting value display portion 302, an adjusting value inputted from the adjusting value input portion 303 is displayed. In this embodiment, at the adjusting value display portion 302, the adjusting value is displayed by an algebraic value (index value) associated with the penetration amount Y. However, the adjusting value may also be displayed by a numerical value directly indicating the penetration amount Y. In this embodiment, the adjusting value is represented by an integer value which uses "0" as a reference value and which is incremented and decremented by "1", and is associated with each of the penetration amounts Y in the case where a changeable range of the penetration amount Y is divided into predetermined change ranges. The reference value of the penetration amount Y can be used as a default (value) of the penetration amount Y set in advance. For example, in this embodiment, the adjusting value input portion 303 is constituted by including a "+ (increment)" button and a "− (decrement)" button. Further, for each operation of this "+(increment)" button or "− (decrement)" button, the adjusting value is incremented or decremented by 1, so that a current adjusting value is displayed on the adjusting value display portion 302. Incidentally, the adjusting value of the penetration amount Y is not designated by a relative value to the default, but may also be designated by an absolute value associated with an associated one of the plurality of penetration amounts. Further, the adjusting value may also include the case where the penetration amount Y is 0 (a state in which the urging member 26 is separated from or simply contacted to the intermediary transfer belt 7).

Further, particularly, the adjusting value may also be constituted so that it is possible to designate that the urging member 26 is spaced from the intermediary transfer belt 7.

Further, on the operating screen 300, a determining portion (OK button) 304 and a canceling portion (cancel button) 305 are provided. By operating the determining portion 304, information on the current adjusting value displayed on the adjusting value display portion 302 is outputted from the operating portion 101 to the controller 200. The controller 200 not only causes the storing portion 220 to store this information but also executes, on the basis of this information, an operation for adjusting the penetration amount Y in the above-described manner. Further, by operating the canceling portion 305, the operation performed after calling up a current operation screen 300 is canceled, so that even when an operation for changing the adjusting value is performed, the operation for adjusting the penetration amount Y is not performed. Incidentally, a constitution in which in the case where the determining portion 304 or the canceling portion 305 is operated, the operating screen 300 is closed may also be employed.

The user increases the adjusting value of the penetration amount Y in the case where the “shock image” at the leading end and the trailing end of the recording material P occurs when an image is formed on a certain recording material P and then is outputted, so that it is possible to alleviate a degree of the “shock image”. Further, the user decreases the adjusting value of the penetration amount Y in the case where the “toner image deviation” occurs when the image is formed on the certain recording material P and then is outputted, so that it is possible to alleviate a degree of the “toner image deviation”.

Incidentally, the default of the penetration amount Y may also be set at a plurality of values depending on, for example, the information on the kind of the recording material P or the like (embodiment 3 described later). Setting information on the penetration amount Y depending on the kind of the recording material P is stored in advance in the storing portion 220. Further, the adjusting value corresponding to each of defaults is set as described above, and then is capable of being stored in the storing portion 220 in association with each of defaults. In this case, thereafter, when the image is formed on the recording material P of the same kind, on the basis of the adjusting value stored in the storing portion 220, the controller 200 is capable of executing the operation for adjusting the penetration amount Y.

Further, inconveniences such as the image defect caused by setting of the penetration amount Y are not limited to those described in this embodiment. The constitution of this embodiment is applicable to any inconvenience which can be expected to be controlled (suppressed) by making the penetration amount Y adjustable.

7. Modified Example

FIG. 6 is a schematic view showing a modified example of the operating screen 300 for providing an instruction to adjust the penetration amount Y displayed on the operating portion 101 in this embodiment. In the operating screen 300 in FIG. 6, elements having similar functions to those in the operating screen 300 in FIG. 5 are represented by the same reference numerals or symbols.

In the example shown in FIG. 6, the adjusting item is not displayed by direct expression indicating the adjusting portion in the image forming apparatus 100 but is displayed by expression indirectly indicating the adjusting portion by a phenomenon which can be consequently adjusted. For example, in the example of FIG. 6, the adjusting item is displayed as an “ADJUSTING SCREEN OF LEADING AND TRAILING END SHOCK IMAGE”.

Thus, even when the adjusting item is displayed by the indirect expression on the operating screen 300, the image forming apparatus 100 of this embodiment may be constituted so as to execute the operation for adjusting the penetration amount Y depending on the operation by the user through the operating portion 101.

8. Effect

As described above, the image forming apparatus 100 according to this embodiment includes the urging member 26 which is contactable to the inner peripheral surface of the belt 7 on the side upstream of the inner roller 21 and downstream of the upstream roller 24 with respect to the rotational direction of the belt 7 and which is capable of urging the belt 7 from the inner peripheral surface side to the outer peripheral surface side, the position changing mechanism (urging mechanism) 16 capable of changing at least one of the urging amount of the urging member 26 into the belt 7 and the state in which the urging member 26 is contacted to and spaced from the belt 7 by changing the position of the urging member 26, the controller 200 for controlling the position changing mechanism 16, and the input portion 300 for inputting the instruction to the controller 200. Further, in this embodiment, depending on the instruction which is inputted from the input portion 300 by the operation of the operator and which relates to adjustment of the position of the urging member 26, the controller 200 causes the position changing mechanism 16 to operate and thus is capable of executing the control for changing the position of the urging member 26. Specifically, the image forming apparatus 100 includes the storing portion 220 for storing the setting of the position of the urging member 26, determined in advance for every kind of the recording material P, when the toner image is transferred onto the recording material P of each of the kinds. Further, the controller 200 is capable of changing the setting of the position of the urging member 26 stored in the storing portion 220 and determined in advance for every kind of the above-described recording material P, by the input from the input portion 300 through the operation by the operator. In this embodiment, the input portion 300 includes the operating portion 101 provided on the image forming apparatus 100 and operated by the operator.

Thus, according to this embodiment, the user is capable of adjusting the penetration amount Y to the penetration amount Y corresponding to the recording material P actually used and the image to be formed. Accordingly, according to this embodiment, as the state of the transfer portion, the shape of the stretched surface of the belt in the neighborhood of the transfer portion can be more properly set in conformity to the recording material.

Embodiment 2

Next, another embodiment of the present invention will be described. In an image forming apparatus according to this embodiment, elements having functions or constitutions identical or corresponding to those of the image forming apparatus of the embodiment 1 are represented by the same numerals or symbols as those in the embodiment 1 and will be omitted from detailed description.

In the embodiment 1, the image forming apparatus 100 had the constitution in which the offset amount X indicating the relative position between the inner roller 21 and the outer roller 9 with respect to the circumferential direction of the inner roller 21 was the certain value, but in this embodiment, a constitution in which the offset amount X is changeable is employed. Incidentally, the definition of the offset amount X is the same as the definition of the offset amount X described in the embodiment 1. Further, in this embodiment, the image forming apparatus 100 is not provided with the urging member 26.

1. Offset Mechanism

With reference to parts (a) and (b) of FIG. 7, an offset mechanism 17 in this embodiment will be described. Parts (a) and (b) of FIG. 7 are schematic side views, for illustrating the offset mechanism 17, of a principal part of a portion in the neighborhood of the secondary transfer nip N2 in this embodiment as seen from a one end portion side (front side on the drawing sheet of FIG. 1) with respect to a rotational axis direction of the inner roller 21 in a direction substantially perpendicular to the rotational axis direction. Part (a) of FIG. 7 shows a state in which the offset amount X is relatively small, and part (b) of FIG. 7 shows a state in which the offset amount X is relatively large. In parts (a) and (b) of FIG. 2, a structure at the one end portion with respect to the rotational axis direction of the inner roller 21 is shown, but a structure at the other end portion is similar thereto (i.e., is substantially symmetrical therewith with respect to a center with respect to the rotational axis direction of the inner roller 21).

As shown in parts (a) and (b) of FIG. 7, in this embodiment, the image forming apparatus 100 includes the offset mechanism 17 as a position changing mechanism for changing the offset amount X (position of the secondary transfer nip N2) by changing a relative position of the inner roller 21 to the outer roller 9 with respect to the circumferential direction.

Opposite end portions of the inner roller 21 with respect to the rotational axis direction are rotatably supported by an inner roller holder 38. The inner roller holder 38 is supported by a frame or the like of the intermediary transfer belt unit 20 so as to be rotatable about an inner roller rotation shaft 38*a*. Thus, the inner roller holder 38 is rotated about the inner roller rotation shaft 38*a*, and thus the inner roller 21 is rotated about the inner roller rotation shaft 38*a*, so that the relative position of the inner roller 21 to the outer roller 9 is changed, and thus the offset amount X can be changed.

The inner roller holder 38 is constituted so as to be rotated by the action of an offset cam 39. The offset cam 39 is supported by the frame or the like of the intermediary transfer belt unit 20 so as to be rotatable about an offset cam rotation shaft 39*a*. The offset cam 39 is rotated about the offset cam rotation shaft 39*a* by receiving drive from an offset cam driving motor 213 as a driving source. Further, the offset cam 39 contacts a cam follower 38*b* provided as a part of the inner roller holder 38. Further, the inner roller holder 38 may be urged by a rotation spring constituted by a tensile spring or the like which is another urging member (elastic member) as another urging means so that the cam follower 38*b* engages with the offset cam 39 27. Incidentally, by the tension of the intermediary transfer belt 7 or urging by the outer roller 9, moment enough to rotate the inner roller holder 38 in a direction in which the cam follower 38*b* engages with the offset cam 39 is obtained in some instances. In this case, the above-described rotation spring does not have to be provided. In this embodiment, the image forming apparatus 100 is provided with an offset cam position sensor (cam HP sensor) 214 as a position detecting means for detecting a position of the offset cam 39 with respect to the rotational direction, particularly a home position (HP) with respect to the rotational direction. The offset cam position sensor 214 can be constituted by, for example, a flag as an indicating portion provided on or coaxially with the offset cam 39 and a photo-interrupter as a detecting portion.

Thus, in this embodiment, the offset mechanism 17 is constituted by including the inner roller holder 38, the offset cam 39, the offset cam driving motor 213, the offset cam position sensor 214, and the like.

As shown in part (a) of FIG. 7, in the case where the offset amount X is urged made relatively small, the offset cam 39 is rotated clockwise by being driven by the offset cam driving motor 213. By this, the inner roller holder 38 is rotated counterclockwise about the inner roller rotation shaft 38*a*, so that the relative position of the inner roller 21 to the outer roller 9 is determined. By this, a state in which the inner roller 21 is disposed at a position where the offset amount X is relatively small.

Further, as shown in part (b) of FIG. 7, in the case where the offset amount X is made relatively large, the offset cam 39 is rotated counterclockwise by being driven by the offset cam driving motor 213. By this, the offset cam holder 38 is rotated clockwise about the inner roller rotation shaft 38*a*, so that the relative position of the inner roller 21 to the outer roller 9 is determined. By this, a state in which the inner roller 21 is disposed at a position where the offset amount X is relatively large is formed.

As shown in part (b) of FIG. 7, by making the offset amount X relatively large, it becomes possible to improve a separation property of the recording material P from the intermediary transfer belt 7.

Further, in this embodiment, the offset cam 39 has a shape such that the position of the inner roller 21 changes depending on an angle of rotation. By this, in this embodiment, by controlling the angle of rotation of the offset cam 39, it becomes possible to adjust the offset amount X. In this embodiment, a controller 200 (FIG. 8) described later controls the offset cam driving motor 213, so that the position of the inner roller 21 is controlled so as to provide a desired offset amount X. FIG. 9 is a graph showing a relationship between the angle of rotation of the offset cam 28 and the offset amount X in this embodiment.

In this embodiment, an initial set value of the offset amount X is set at +2.5 mm. Further, in this embodiment, the offset amount X can be set in a range of −1.3 mm to +2.5 mm. Incidentally, the present invention is not limited thereto, but the offset amount X may suitably be about −3 mm to about +3 mm.

Incidentally, the offset amount X may only be required to be a predetermined value when the recording material P passes through the secondary transfer nip N2 (during the secondary transfer).

2. Control Mode

FIG. 8 is a schematic block diagram showing a control mode of a principal part of the image forming apparatus 100 in this embodiment. In FIG. 8, elements having identical or corresponding functions or constitutions to those shown in FIG. 3 are represented by the same reference numerals or symbols. In this embodiment, to the controller 200, the offset cam driving motor 213 and the offset cam position sensor 214 are connected. In this embodiment, by an instruction from the arithmetic portion 201, the drive controller 210 operates the driving means for driving the respective portions of the image forming apparatus 100, such as the offset cam driving motor 213 and the like. In this embodiment, during the non-image formation, typically in the stand-by state, the image forming apparatus 100 is capable of performing an operation for adjusting the offset amount X.

3. Adjusting of Offset Amount

In general, by increasing the offset amount X, it can be said that the increased offset amount X is advantageous for improving the separation property of the recording material P from the intermediary transfer belt 7 (see an embodiment 3 described later). However, when the offset amount X is excessively increased, the toner and the recording material P rub with each other strongly before the recording material P enters a region where the toner is electrically transferred onto the recording material P, so that a deviation amount of the toner image becomes large in some instances.

Thus, for example, the "separation property" of the recording material P from the intermediary transfer belt 7 and the "toner image deviation" provide a contradictory relationship with respect to the offset amount X. Further, the "separation property" of the recording material P from the intermediary transfer belt 7 and the "toner image deviation" are also largely influenced by a characteristic of the recording material P. However, the recording materials P available in the market and diversified, and therefore, it is desired that depending on the recording material P actually used by the user, the offset amount X is finely adjusted and thus meets various characteristic of the recording material P, such as thickness, rigidity and a surface property. Further, a degree of an occurrence of image defect is difference also depending on an image to be formed, so that it is also effective that the offset amount X can be finely adjusted depending on the image to be formed.

Therefore, in this embodiment, as regards the image forming apparatus 100, the user is capable of arbitrarily adjusting the offset amount X. By this, the user is capable of adjusting the offset amount X to an offset amount X corresponding to the recording material P actually used or the image to be formed.

Next, an adjusting method of the offset amount X (position of the inner roller 21) in this embodiment will be specifically described.

As shown in FIG. 8, in this embodiment, in the storing portion 220, offset cam position information 224 acquired from the offset cam position sensor 214 for detecting the home position (HP) of the offset cam 39 is stored. Further, in this embodiment, in the storing portion 220, an offset amount conversion table 225 for rotationally driving the offset cam 39 to a predetermined position is stored.

The offset cam amount conversion table 225 shows a relationship between the angle of rotation of the offset cam 39 and the offset amount X as shown in FIG. 9. On the basis of the offset cam amount conversion table 225 and the offset cam position information 224, the arithmetic portion 201 acquires the angle of rotation of the offset cam 39 necessary to adjust the offset amount X to a predetermined offset amount X. Then, depending on a result thereof, the offset cam 39 is rotated by operating the offset cam driving motor 213 by a necessary control amount by the drive controller 210.

In this embodiment, the user provides an instruction from an input portion of the operating portion 101 to the controller 200 so as to adjust the offset amount X. A specific operating screen in the operating portion 101 will be described later. Further, the arithmetic portion 201 of the controller 200 reflects information on the offset amount X designated by the user through the input portion of the operating portion 101 in an operation of the offset cam driving motor 213. Incidentally, in this embodiment, the adjustment of the offset amount X is instructed through the operating portion 101, but can also be instructed from the external device communicatably connected to the image forming apparatus 100. In this case, the above-described interface portion (input/output circuit) and the like function as the input portion.

4. Operating Screen

Next, an instructing method of adjustment of the offset amount X from the operating portion 101 in this embodiment will be described.

FIG. 10 is a schematic view showing an operating screen 400 constituting an input portion for providing an instruction to adjust the offset amount X displayed on the operating portion 101. In this embodiment, similarly as in the embodiment 1, the operating screen 300 is displayed on this touch panel of the operating portion 101. The operating screen 400 for providing the instruction to adjust the offset amount X displayed on the operating portion 101 has the same constitution as the constitution of the operating screen 300 (FIG. 5). Accordingly, in the operating screen 400 in this embodiment, elements having functions similar to those for the operating screen 300 will be appropriately omitted from description.

In this embodiment, on the operating screen 400, an adjusting item display portion 401 is an adjusting value display portion 402, an adjusting value input portion 403, a determining portion 404, and a canceling portion 405 are provided. These portions have functions similar to those of the adjusting item display portion 301, the adjusting value display portion 302, the adjusting value input portion 303, the determining portion 304, and the canceling portion 305, respectively, on the operating screen 300 in the embodiment 1. In this embodiment, at the adjusting item display portion 401, an adjusting item is displayed by direct expression showing an adjusting portion in the image forming apparatus 100. For example, in this embodiment, an "OFFSET AMOUNT ADJUSTING SCREEN OF SECONDARY TRANSFER ROLLER" is displayed.

Further, in this embodiment, at the adjusting value display portion 402, the adjusting value is displayed by an algebraic value (index value) associated with the offset amount X. However, the adjusting value may also be displayed by a numerical value directly indicating the offset amount X. In this embodiment, the adjusting value is represented by an integer value which uses "0" as a reference value and which is incremented and decremented by "1", and is associated with each of the offset amounts X in the case where a changeable range of the offset amount X is divided into predetermined change ranges. The reference value of the offset amount X can be used as a default (value) of the penetration amount Y set in advance. Further, similarly as in the embodiment 1, for each operation of a "+ (increment)" button or a "− (decrement)" button of the adjusting value input portion 403, the adjusting value is incremented or decremented by 1, so that a current adjusting value is displayed on the adjusting value display portion 402. Incidentally, the adjusting value of the penetration amount Y is not designated by a relative value to the default, but may also be designated by an absolute value associated with an associated one of the plurality of penetration amounts. Further, the adjusting value may also include the case where the offset amount X is 0. Further, for example, the offset amount X may also designate at least one of a predetermined positive value (for example, +2.5 mm) and 0 or a predetermined negative value (for example, −1.3 mm).

Further, similarly as in the case of the embodiment 1, by operating the determining portion (OK button) 404, information on the current adjusting value displayed on the adjusting value display portion 402 is outputted from the operating portion 101 to the controller 200. The controller 200 not only causes the storing portion 220 to store this information but also executes, on the basis of this information, an operation for adjusting the offset amount X in the above-described manner. Further, similarly as in the case of the embodiment 1, by operating the canceling portion (cancel button) 405, the operation performed after calling up a current operation screen 300 is canceled, so that even when an operation for changing the adjusting value is performed, the operation for adjusting the offset amount X is not performed. Incidentally, a similarly as in the case of the embodiment 1, a constitution in which in the case where the determining portion 404 or the canceling portion 405 is operated, the operating screen 300 is closed may also be employed.

The user decreases the adjusting value of the penetration amount Y in the case where the “toner image deviation” occurs when the image is formed on the certain recording material P and then is outputted, so that it is possible to alleviate a degree of the “toner image deviation”. Further, the user is capable of increasing the adjusting value of the offset amount X in the case where the “improper separation” of the recording material P from the intermediary transfer belt 7 occurs when, for example, an image is formed on a certain recording material P and then is outputted. By this, the “separation property” of the recording material P from the intermediary transfer belt 7 can be improved.

Incidentally, the default of the offset amount X may also be set at a plurality of values depending on, for example, the information on the kind of the recording material P or the like (embodiment 3 described later). Setting information on the offset amount X depending on the kind of the recording material P is stored in advance in the storing portion 220. Further, the adjusting value corresponding to each of defaults is set as described above, and then is capable of being stored in the storing portion 220 in association with each of defaults. In this case, thereafter, when the image is formed on the recording material P of the same kind, on the basis of the adjusting value stored in the storing portion 220, the controller 200 is capable of executing the operation for adjusting the offset amount X.

Further, inconveniences such as the image defect caused by setting of the offset amount X are not limited to those described in this embodiment. The constitution of this embodiment is applicable to any inconvenience which can be expected to be controlled (suppressed) by making the offset amount X adjustable.

For example, the “toner image deviation” can be alleviated by making the adjusting value of the offset amount X small, while the small offset value worsens a risk that the “separation property” of the recording material P. particularly, in the case where the default of the offset amount is set at a plural levels depending on the information on the kind of the recording material, when the default of the offset amount is a large value, there is a need to pay attention. When the improper separation of the recording material occurs, not only the operation of the main assembly stops, but also it takes time to remove the recording material which is at rest at an intermediary portion of the main assembly, and therefore, an operating ratio of the image forming apparatus lowers. For that reason, in the case of the recording material which has a small thickness and which is high in risk that the improper separation occurs, a constitution in which the user cannot select setting of making the offset amount X smaller than the default through the operating portion 101 may also be employed. Or, a warning screen showing that there is a risk of occurrence of the improper separation may be displayed on the operating portion 101. Further, even when the user sets the offset amount X so as to be made smaller than the default through the operating portion 101, this change in setting may also be prevented from being reflected.

In this embodiment, when job information (image information, information on an image forming condition, a start instruction) is inputted to the controller 200, the controller 200 acquires the information on the kind of the recording material P used in the image formation, included in the job information. In this embodiment, the information on the kind of the recording material P at least includes the information on the basis weight of the recording material P. In the case where this basis weight is smaller than a predetermined value, the controller limits adjustment of the offset amount X performed by the user through the operating portion 101 and causes the operating portion 101 to display a warning screen. In the case where the predetermined value of the basis weight is, for example, 180 g/m$^2$, when paper designated by the user is thin paper with the basis weight of 52 g/m$^2$, a constitution in which the offset amount X cannot be adjusted from the default is employed.

5. Modified Example

FIG. 11 is a schematic view showing a modified example of the operating screen 400 for providing an instruction to adjust the offset amount X displayed on the operating portion 101 in this embodiment. In the operating screen 400 in FIG. 11, elements having similar functions to those in the operating screen 400 in FIG. 10 are represented by the same reference numerals or symbols.

In the example shown in FIG. 11, the adjusting item is not displayed by direct expression indicating the adjusting portion in the image forming apparatus 100 but is displayed by expression indirectly indicating the adjusting portion by a phenomenon which can be consequently adjusted. For example, in the example of FIG. 6, the adjusting item is displayed as an “ADJUSTING SCREEN OF IMAGE DEVIATION”.

Thus, even when the adjusting item is displayed by the indirect expression on the operating screen 400, the image forming apparatus 100 of this embodiment may be constituted so as to execute the operation for adjusting the offset amount X depending on the operation by the user through the operating portion 101.

Incidentally, in this embodiment, the constitution in which the image forming apparatus 100 is not provided with the urging member 26 was described, but the image forming apparatus 100 may also be provided with the urging member 26 so as to provide a predetermined penetration amount Y.

6. Effect

As described above, the image forming apparatus 100 according to this embodiment includes the position changing mechanism (offset mechanism) 17 capable of changing the relative position between the inner roller 21 and the outer roller (outer member) 9 with respect to the circumferential direction by changing the position of at least one of the inner roller 21 and the outer member 9, the controller 200 for controlling the position changing mechanism 17, and the input portion 400 for inputting the instruction to the controller 200. Further, in this embodiment, depending on the instruction which is inputted from the input portion 400 by the operation of the operator and which relates to adjustment of the above-described relative position, the controller 200 causes the position changing mechanism 17 to operate and thus is capable of executing the control for changing the above-described relative position. Specifically, the image forming apparatus 100 includes the storing portion 220 for storing the setting of the above-described relative position, determined in advance for every kind of the recording material P, when the toner image is transferred onto the recording material P of each of the kinds. Further, the controller 200 is capable of changing the setting of the above-described relative position stored in the storing portion 220 and determined in advance for every kind of the above-described recording material P, by the input from the input portion 400 through the operation by the operator. In this embodiment, the input portion 400 includes the operating portion 101 provided on the image forming apparatus 100 and operated by the operator.

Thus, according to this embodiment, the user is capable of adjusting the offset amount X to the penetration amount Y corresponding to the recording material P actually used and the image to be formed. Accordingly, according to this embodiment, as the state of the transfer portion, the position of the transfer portion can be more properly set in conformity to the recording material.

Embodiment 3

Next, another embodiment of the present invention will be described. In an image forming apparatus according to this embodiment, elements having functions or constitutions identical or corresponding to those of the image forming apparatus of the embodiments 1 and 2 are represented by the same numerals or symbols as those in the embodiments 1 and 2 and will be omitted from detailed description.

1. Outline of Structure of Image Forming Apparatus of this Embodiment

In this embodiment, the image forming apparatus 100 includes the urging mechanism 16 and the offset mechanism 17 which are described in the embodiments 1 and 2, respectively. Further, in this embodiment, on the basis of the information on the kind of the recording material P relating to the rigidity of the recording material P, particularly, on the basis of information on a basis weight of paper as an example of the recording material P, the default of the offset amount X is set. Further, in this embodiment, on the basis of the information on the kind of the recording material P relating to the rigidity of the recording material P, particularly, on the basis of the information on the basis weight of the paper as the example of the recording material P, the default of the penetration amount Y is set. In this embodiment, the image forming apparatus 100 changes the offset amount X on the basis of the information on the basis weight of the recording material P. Further, in this embodiment, the image forming apparatus 100 changes the penetration amount Y in synchronism with the change of the offset amount X. Further, in this embodiment, in the image forming apparatus 100, the user is capable of arbitrary adjusting each of the offset amount X and the penetration amount Y.

2. Outline of Setting of Offset Amount

Part (a) of FIG. 18 is a schematic sectional view (cross-section substantially perpendicular to the rotational axis direction of the inner roller 21) for illustrating behavior of the recording material P in the neighborhood of the secondary transfer nip N2.

As described above, depending on the position (shape) of the secondary transfer nip N2 and the rigidity of the recording material P, the behavior of the recording material P in the neighborhood of the upstream side and the downstream side of the secondary transfer nip N2 with respect to the feeding direction of the recording material P changes. Further, for example, in the case where the recording material P is "thin paper" which is an example of a recording material with low rigidity, a jam (paper jam) occurs in some instances due to the "improper separation" of the recording material P from the intermediary transfer belt 7. This phenomenon becomes noticeable in the case where the rigidity of the recording material P is small since the recording material P is liable to stick to the intermediary transfer belt 7 due to weak stiffness of the recording material P.

That is, in the cross-section shown in part (a) of FIG. 18, a line showing the stretched surface of the intermediary transfer belt 7 formed by being stretched by the inner roller 21 and the pre-secondary transfer roller 24 is a stretched line T. Incidentally, the pre-secondary transfer roller 24 is an example of an upstream roller, of the plurality of stretching rollers, disposed upstream of and adjacent to the inner roller 21 with respect to the rotational direction of the intermediary transfer belt 7. Further, in the same cross-section, a rectilinear line passing through a rotation center of the inner roller 21 and a rotation center of the outer roller 9 is referred to as a nip center line Lc. Further, in the same cross-section, a line substantially perpendicular to the nip center line Lc is referred to as a nip line Ln. Incidentally, part (a) of FIG. 18 shows a state in which with respect to a direction along the stretched line T, the rotation center of the outer roller 9 is offset to a side upstream of the rotation center of the inner roller 21 with respect to the rotational direction of the intermediary transfer belt 7.

At this time, in a state in which the recording material P is nipped between the inner roller 21 and the outer roller 9 in the secondary transfer nip N2, there is a tendency that the recording material P tries to hold an attitude thereof substantially along the nip line Ln. For that reason, roughly, in the case where with respect to the direction along the stretched line T, the rotation center of the inner roller 21 and the rotation center of the outer roller 9 are close to each other, as indicated by a broken line A in part (a) of FIG. 18, a discharge angle θ of the recording material P becomes small. That is, the leading end of the recording material P with respect to the feeding direction assumes an attitude such that the leading end is discharged close to the intermediary transfer belt 7 when the recording material P is discharged from the secondary transfer nip N2. By this, the recording material P is liable to stick to the intermediary transfer belt 7, so that the "improper separation" of the recording material P from the intermediary transfer belt 7 is liable to occur. On the other hand, roughly, as in the direction along the stretched line T, the rotation center of the outer roller 9 is disposed on the side upstream of the rotation center of the inner roller 21 with respect to the rotational direction of the intermediary transfer belt 7, the discharge angle θ of the recording material P becomes large as indicated by a solid line in part (a) of FIG. 18. That is, the leading end of the recording material P assumes an attitude such that when the recording material P is discharged from the secondary transfer nip N2, the leading end is discharged in a direction in which the leading end is moved away from the intermediary transfer belt 7. By this, the recording material P does not readily stick to the intermediary transfer belt 7, so that the "separation property" of the recording material P from the intermediary transfer belt 7 is improved.

On the other hand, as described above, for example, in the case where the recording material P is "thick paper" which is an example of the recording material P with high rigidity, when a trailing end of the recording material P with respect to the feeding direction passes through the feeding guide 14, a trailing end portion of the recording material P with respect to the feeding direction collides against the intermediary transfer belt 7 in some instances. By this, image defect (by "jumping-up") occurs in some instances at the trailing end portion of the recording material P with respect to the feeding direction. This phenomenon becomes noticeable in the case where the rigidity of the recording material P is high since the trailing end portion of the recording material P with respect to the feeding direction is liable to collide violently against the intermediary transfer belt 7 due to strong stiffness of the recording material P.

That is, as described above, in the cross-section shown in part (a) of FIG. 18, in a state in which the recording material P is nipped between the inner roller 21 and the outer roller 9 in the secondary transfer nip N2, the recording material P tries to hold an attitude thereof substantially along the nip line Ln. For that reason, generally, the nip line Ln has a shape such that the nip line Ln bites into the stretched line T as in the direction along the stretched line T, the rotation center of the outer roller 9 is disposed on the side upstream of the rotation center of the inner roller 21 with respect to the rotational direction of the intermediary transfer belt 7. As a result, when the trailing end of the recording material P passes through the feeding guide 14, as indicated by a broken line B in part (a) of FIG. 18, the trailing end portion of the recording material P with respect to the feeding direction collides against the intermediary transfer belt 7, so that the image defect (by the "jumping-up") is liable to occur at the trailing end portion of the recording material P. On the other hand, generally, with respect to the direction along the stretched line T, the rotation center of the inner roller 21 and the rotation center of the outer roller 9 are brought near to each other, when the trailing end of the recording material P with respect to the feeding direction passes through the feeding guide 15, collision of the trailing end of the recording material P against the intermediary transfer belt 7 is suppressed. By this, the image defect (by the "jumping-up" at the trailing end portion of the recording material P with respect to the feeding direction does not readily occur.

As countermeasures against such a problem, the change in offset amount X depending on the kind of the recording material P as described above with reference to FIG. 16 is effective.

In FIG. 16, the outer roller 9 is illustrated so as to contact the reference line L1 (stretched line T) without being deformed virtually with respect to the reference line L1. However, as described above, a material of an outermost layer of the outer roller 9 is an elastic member such as a rubber or a sponge, and in actuality, the outer roller 9 is urged and deformed by the urging spring 9*b* in a direction (a white arrow direction) toward the inner roller 21. When the outer roller 9 is offset and disposed on a side upstream of the inner roller 21 with respect to the rotational direction of the intermediary transfer belt 7 and then is urged by the urging spring 9*b* so as to nip the intermediary transfer belt 7 between itself and the inner roller 21, the secondary transfer nip N2 having a substantially S-shape is formed. Further, an attitude of the recording material P guided and sent by the feeding guide 14 is also determined by following the shape of the secondary transfer nip N2. With an increasing offset amount X, the recording material P is bent in a larger degree. For that reason, as described above, for example, in the case where the recording material P is the "thin paper", by increasing the offset amount X, it is possible to improve the separation property of the recording material P from the intermediary transfer belt 7 after the recording material P passes through the secondary transfer nip N2. However, when the offset amount X is large, as described above, for example, in the case where the recording material P is the "thick paper", the trailing end portion of the recording material P with respect to the feeding direction collides against the intermediary transfer belt 7 when the trailing end of the recording material P with respect to the feeding direction passes through the feeding guides 14. By this, the collision causes a lowering in image quality at the trailing end portion of the recording material P with respect to the feeding direction. For that reason, in this case, the offset amount X may only be required to be made small.

3. Outline of Setting of Position of Urging Member

Part (b) of FIG. 18 is a schematic sectional view (cross-section substantially perpendicular to the rotational axis direction of the inner roller 21) for illustrating a feeding attitude of the recording material P in the neighborhood of the secondary transfer nip N2. Incidentally, part (b) of FIG. 18 shows a state in which the rotation center of the inner roller 21 and the rotation center of the outer roller 9 are disposed at the substantially same position with respect to the direction along the stretched line T.

As described above, depending on the rigidity of the recording material P, the attitude of the recording material P fed from the feeding guide 14 to the secondary transfer nip N2 changes. Further, for example, in the case where the recording material P is the "thick paper", in the neighborhood of the secondary transfer nip N2, a gap G is liable to be formed between the intermediary transfer belt 7 and the recording material P, so that "scattering" is liable to occur.

That is, in part (b) of FIG. 18, in the neighborhood of the inlet of the secondary transfer nip N2 (in the neighborhood of the upstream portion of the inner roller 21 with respect to the rotational direction of the intermediary transfer belt 7), a distance in which the intermediary transfer belt 7 and the recording material P contact each other along is defined as a contact distance D. Specifically, the contact distance D is a distance between a contact start position between the inner roller 21 and the intermediary transfer belt 7 and a contact start position between the recording material P and the intermediary transfer belt 7. For example, in the case where the recording material P is the "thick paper", the rigidity of the recording material P is high, and therefore, the recording material P is not readily bent in the neighborhood of the secondary transfer nip N2, so that the contact distance D becomes small. For that reason, the gap G is formed between the intermediary transfer belt 7 and the recording material P, and electric discharge occurs in the gap G by the influence of a transfer electric field, so that the toner image scatters and thus the image defect ("scattering") occurs in some instances.

As countermeasures against such a problem, the urging member 26 contactable to the inner peripheral surface of the intermediary transfer belt 7 in the neighborhood of the inlet of the secondary transfer nip N2 is provided, so that it is effective that the penetration amount Y described with reference to parts (a) and (b) of FIG. 17 is provided.

As shown in parts (a) and (b) of FIG. 17, the intermediary transfer belt 7 is projected outward by the urging member 26, whereby the contact distance D is increased, so that the gap G between the intermediary transfer belt 7 and the recording material P in the neighborhood of the inlet of the secondary transfer nip N2 can be reduced. By this, the "scattering" can be suppressed.

4. Relationship Between Offset Amount and Penetration Amount

Next, a default of the offset amount X and a default of the penetration amount Y in this embodiment will be described. In this embodiment, for simplicity, the case where information on the basis weight of the paper as the recording material P is used as information on the kind of the recording material P relating to the rigidity of the recording material P will be principally described as an example. Further, as an example of the recording material P with low rigidity, the "thin paper" is used, and as an example of the recording material P with high rigidity, the "thick paper" is used. However, the information on the kind of the recording material P relating to the rigidity of the recording material P is not limited to the information on the basis weight of the recording material P.

On the recording materials P of a wide variety of kinds different in rigidity such as the "thin paper" and the "thick paper", in order to form good images by suppressing the image defect occurring in the neighborhood of the secondary transfer nip N2 while ensuring a good feeding property of the recording material P in the neighborhood of the secondary transfer nip N2, it is effective not only that the offset amount X is changed depending on the kind of the recording material P but also that the urging member 26 contacting the inner peripheral surface of the intermediary transfer belt 7 in the neighborhood of the inlet of the secondary transfer nip N2 is provided.

However, for example, in the case where the recording material P is the "thin paper", when the offset amount X is increased and the intermediary transfer belt 7 is projected outward by the urging member 26, the following phenomenon occurs. That is, the contact distance D becomes excessively large, the image defect such that the toner image is dynamically disturbed by friction between the toner image on the intermediary transfer belt 7 and the recording material P, i.e., a so-called "roughness" (or the above-described "toner image deviation") occurs in some instances.

Therefore, in this embodiment, in the case where the offset amount X is largely changed by changing a position of at least one of the inner roller 21 and the outer roller 9, the image forming apparatus 100 employs a constitution in which the penetration amount Y is changed so as to be decreased by changing the position of the urging member 26. Particularly, in this embodiment, the image forming apparatus 100 employs a constitution in which the offset amount X is changed by changing the position of the urging member 26. Further, in this embodiment, the image forming apparatus 100 employs a constitution in which on the basis of the information on the kind of the recording material P relating to the rigidity of the recording material P, the change in offset amount X and the change in penetration amount Y are made in synchronism with each other.

Parts (a) and (b) of FIG. 12 are schematic side views each showing a principal part as seen substantially in parallel to the rotational axis direction from one end portion side (front side on the drawing sheet of FIG. 1) of the rotational axis direction of the inner roller 21 in the neighborhood of the secondary transfer nip N2. Part (a) of FIG. 12 shows a state of the case of the "thick paper", and part (b) of FIG. 12 shows a state of the case of the "thin paper".

Further, as shown in part (a) of FIG. 12, for example, in the case where the recording material P is the "thick paper", not only the inner roller 21 is disposed at a first inner roller position where the offset amount X is a first offset amount X1, but also the urging member 26 is disposed at a first urging member position where the penetration amount y is a first penetration amount Y1. Further, as shown in part (b) of FIG. 12, for example, in the case where the recording material P is the "thin paper", the following arrangement is employed. Not only the inner roller 21 is disposed at a second inner roller position where the offset amount X is a second offset amount X2 larger than the first offset amount X1, but also the urging member 26 is disposed at a second urging member position where the penetration amount Y is a second penetration amount Y2 smaller than the first penetration amount Y1. The first offset amount X1 may be a positive value, 0, or a negative value, and the second offset amount X2 is typically the positive value. Further, the first penetration amount Y1 is positive value, and the second penetration amount Y2 may be 0 or the positive value. In this embodiment, a relative position between the inner roller 21 and the outer roller 9 in the case where the offset amount X is the first offset amount X1 is a first relative position, and the relative position between the inner roller 21 and the outer roller 9 in the case where the offset amount X is the second offset amount X2 is a second relative position. That is, in this embodiment, a position of the secondary transfer nip N2 in the case where the offset amount X is the first offset amount X1 is a first position of the transfer portion, and the position of the secondary transfer nip N2 in the case where the offset amount X is the second offset amount X2 is a second position of the transfer portion.

Incidentally, the change in offset amount X and penetration amount Y made in synchronism with each other means the following changes. Typically, in the case where the image is formed on a certain recording material P, when the offset amount X is changed before the recording material P reaches the secondary transfer nip N2, the above-described change refers to that the penetration amount Y is also changed before the recording material P reaches the secondary transfer nip N2. Further, as another example, for example, in the case where a predetermined adjusting operation such as an operation for applying a secondary transfer voltage is performed for controlling the secondary transfer voltage when the offset amount X is changed before a start of the adjusting operation, the above-described change refers to that the penetration amount Y is also changed before the start of the adjusting operation.

As shown in part (a) of FIG. 12, in the case of the "thick paper", the urging member 26 causes the stretched line T to project outward. By this, the contact distance D between the intermediary transfer belt 7 and the recording material P in the neighborhood of the inlet of the secondary transfer nip N2 can be increased, so that the "scattering" can be suppressed. Further, as shown in part (b) of FIG. 12, in the case of the "thin paper", not only the inner roller 21 moves toward a downstream side of the rotational direction of the intermediary transfer belt 7, but also the urging member 26 is separated (spaced) from the intermediary transfer belt 7.

Here, the case where the inner roller 21 is disposed at the second inner roller position (second offset amount X2) shown in part (b) of FIG. 12 while the urging member 26 is kept at the first urging member position (first penetration amount Y1) shown in part (a) of FIG. 12 will be considered. In this case, the contact distance D is further made larger than the contact distance D in a state in which as shown in part (a) of FIG. 12, the inner roller 21 is disposed at the first inner roller position (first offset amount X1) and the urging member 26 is disposed at the first urging member position (first penetration amount Y1). For that reason, the image defect such that the toner image is dynamically disturbed by the friction between the toner image on the intermediary transfer belt 7 and the recording material P, i.e., so-called "roughness" occurs. On the other hand, in this embodiment, as shown in part (b) of FIG. 12, in synchronism (interrelation) with that the inner roller 21 is disposed at the second inner roller position (second offset amount X2), the urging member 26 is disposed at the second urging member position (second penetration amount Y2). In this embodiment, particularly, at this time, the urging member 26 is disposed at a position where the urging member 26 is spaced from the intermediary transfer belt 7. By this, the contact distance D is prevented from increasing more than necessary, so that it is possible to suppress the "roughness".

In this embodiment, on the basis of a basis weight M of the recording material P, a pattern of a combination of the offset amount X (X1, X2) with the penetration amount Y (Y1, Y2) is set at the following two patterns, for example. Information on setting of the offset amount X and the penetration amount Y depending on the kind of the recording material P (the basis weight in this embodiment) is stored in advance in the storing portion 220.

$$M \geq 52\ \text{g/m}^2\text{: } X1=-1.3\ \text{mm},\ Y1=1.5\ \text{mm} \quad \text{(a)}$$

$$M < 52\ \text{g/m}^2\text{: } X2=+2.5\ \text{mm},\ Y2=0\ \text{mm (spaced)} \quad \text{(b)}$$

As shown in this embodiment, in the case where the material of the urging member 26 is the resin material and particularly where a shape of the urging member 26 is a sheet shape, positions of the inner roller 21 and the urging member 26 in the above-described setting (b) may preferably be used as home positions. This is because a phenomenon that the urging member 26 causes creep deformation by continuously receiving pressure due to tension of the intermediary transfer belt 7 for a long period is suppressed. When the urging member 26 causes the creep deformation, there is a possibility that the penetration amount Y1 in the case of, for example, the "thick paper" is made smaller than 1.5 mm in the above-described setting (a) by the change with time. Here, the home position refers to a position where the image forming apparatus 100 is in a sleep state or in a state in which the main switch thereof is turned off.

Incidentally, in this embodiment, the urging member 26 can be spaced from the inner peripheral surface of the intermediary transfer belt 7, but the present invention is not limited thereto. In the case where the penetration amount Y is 0, the urging member 26 may also contact the intermediary transfer belt 7. Further, the second penetration amount Y2 may only be required to be smaller than the first penetration amount Y1 and a constitution in which the penetration amount Y is not 0 may also be employed. For example, the constitution in which the penetration amount Y is not 0 is easily employed in the case where the influence of the creep deformation is sufficiently smaller or eliminated, such as the case where the urging member 26 is a thin metal plate or a rotatable roller. For example, on the basis of a basis weight M of the recording material P, a pattern of a combination of the offset amount X (X1, X2) with the penetration amount Y (Y1, Y2) may also be set at the following two patterns. Information on setting of the offset amount X and the penetration amount Y depending on the kind of the recording material P (the basis weight in this embodiment) is stored in advance in the storing portion 220.

$$M \geq 52\ \text{g/m}^2\text{: } X1=-1.3\ \text{mm},\ Y1=1.5\ \text{mm} \quad \text{(a)}$$

$$M < 52\ \text{g/m}^2\text{: } X2=+2.5\ \text{mm},\ Y2=0.5\ \text{mm} \quad \text{(b)}$$

The offset amount X, the penetration amount Y and the kind of the recording material P (the basis weight in this embodiment) assigned to the combination of the adjust X and the penetration amount are not limited to the above-described specific values. These values can be appropriately set through an experiment or the like from the viewpoints of the improvement in separation property of the recording material P from the intermediary transfer belt 7 and the suppression of the image defect occurring in the neighborhood of the secondary transfer nip N2 which are as described above. Further, in this embodiment, switching of the offset amount X (the position of the inner roller 21) was described by taking the case of two levels as an example, but the present invention is not limited thereto. The change in offset amount X (the position of the inner roller 21) may also be made at three or more levels or continuously. Incidentally, in the case where the offset amount X is changeable to three or more levels, a constitution in which the penetration amount Y is not necessarily required to be decreased with an increasing offset amount X. For example, in the case where a change amount of the offset amount X is smaller or in the case where the offset amount X is changed in a negative range, a degree of a fluctuation in the above-described contact distance D is small. In this case, the penetration amount Y is not necessarily be required to be made small. Further, in the case where the setting for the change in offset amount X to the three levels or more includes setting that the penetration amount y is 0, for the reason similar to the above-described reason, the setting thereof may preferably be used as setting for the home position. The setting may also be setting which is not used during the image formation but which is used only the sleep state of the image forming apparatus 100 or in the state in which the main switch of the image forming apparatus 100 is turned off.

5. Control Mode

FIG. 13 is a schematic block diagram showing a control mode of a principal part of the image forming apparatus 100 in this embodiment. In FIG. 13, elements having identical or corresponding functions or constitutions to those shown in FIGS. 3 and 8 are represented by the same reference numerals or symbols. In this embodiment, the controller 200 is capable of operating the urging cam driving motor 211 and the offset cam driving motor 213 similarly as described in the embodiments 1 and 2, respectively.

When job information (image information, information on an image forming condition, a start instruction) is inputted to the controller 200, the controller 200 acquires the information on the kind of the recording material P used in the image formation, included in the job information. In this embodiment, the information on the kind of the recording material P at least includes the information on the basis weight of the recording material P. The controller 200 determines a pattern of a combination of the offset amount X with the penetration amount Y on the basis of the acquired information on the kind of the recording material P. In the memory 220, the information on the above-described pattern depending on the basis weight of the recording material P as in the above-described specific example is stored in advance. Accordingly, on the basis of the information on the kind of the recording material P, the controller 200 determines the pattern corresponding to the recording material P on which the image is formed, from the above-described patterns stored in the memory (storing portion) 220. Then, the controller 200 causes the offset mechanism 17 and the urging mechanism 16 to operate so as to provide the determined pattern of the combination of the offset amount X with the penetration amount Y before the recording material P is fed to the secondary transfer nip N2.

Further, in this embodiment, as described later, the image forming apparatus 100 is capable of performing an operation for adjusting each of the offset amount X and the penetration amount y during non-image formation, typically in a stand-by state.

6. Adjustment of Offset Amount and Position of Urging Member

In this embodiment, from the above-described viewpoints of the feeding property of the recording material P and the suppression of the image defect, depending on the kind (the basis weight in this embodiment) of the recording material P, defaults of the offset amount X and the penetration amount Y are set, respectively. However, similar as described in the embodiments 1 and 2, it is desired that the offset amount X can be adjusted depending on the recording material P actually used by the user or on the image formed. Further, in the constitution in which the penetration amount Y is changed depending on the offset amount X as in this embodiment, it is desired that the penetration amount Y can be finely adjusted depending on the recording material P actually used by the user or on the image formed.

Therefore, in this embodiment, the image forming apparatus 100 is constituted so that the user is capable of arbitrarily changing the offset amount X. Particularly, in this embodiment, the image forming apparatus 100 is constituted so that the user is capable of arbitrarily changing the offset amount X to the first offset amount X1 and the second offset amount X2 which are described above. Further, in this embodiment, the image forming apparatus 100 is constituted so that the user is capable of arbitrarily adjusting the penetration amount Y when the offset amount X is the first offset amount X1 or the second offset amount X2. By this, the user is capable of adjusting the offset amount X and the penetration amount Y to those corresponding to the recording material used actually by the user or to the image formed.

However, depending on the offset amount X (the position of the inner roller 21), it would be considered that when the penetration amount Y (the position of the urging member 26) is freely settable, the image defect occurs or a normal operation is hindered by interference between component parts in some cases.

Therefore, in this embodiment, a restriction is put in the adjustment of the penetration amount Y depending on the offset amount X.

7. Operating Screen

Next, an instructing method of adjustment of each of the offset amount X and the penetration amount Y from the operating portion 101 in this embodiment will be described.

Part (a) of FIG. 14 is a schematic view showing an operating screen 500 (herein, also referred to as "offset operating screen") constituting an input portion for providing an instruction to adjust the offset amount X displayed on the operating portion 101. Parts (b) of FIG. 14 is a schematic view showing an operating screen 300 (herein, also referred to as a "penetration amount operating screen") constituting the input portion for providing an instruction to adjust the penetration amount Y displayed on the operating portion 101. In this embodiment, similarly as in the embodiments 1 and 2, the offset amount operating screen 500 and the penetration amount operating screen 300 are displayed on this touch panel of the operating portion 101.

As shown in part (a) of FIG. 14, in this embodiment, on the offset amount operating screen 500, an adjusting item display portion 501, a determining portion 503, and a canceling portion 504 are provided. The adjusting item display portion 501, the determining portion 503 and the canceling portion 504 have functions similar to those of the adjusting item display portion 401, the determining portion 404, and the canceling portion 405, respectively, on the operating screen 400 in the embodiment 2.

In this embodiment, as the offset amount selecting portion 502, an "UPSTREAM (RECOMMENDED PAPER: THIN PAPER)" corresponding to the above-described offset amount X2 and a "DOWNSTREAM (RECOMMENDED PAPER: THICK PAPER)" corresponding to the above-described first offset amount X2 are selectable. In part (a) of FIG. 14, a state in which the "UPSTREAM (RECOMMENDED PAPER: THIN PAPER)" is selected is shown. In the state in which the "UPSTREAM (RECOMMENDED PAPER: THIN PAPER)" is selected, by operating the determining portion (OK button) 503, information for selecting the above-described second offset amount X2 is outputted from the operating portion 101 to the controller 200. The controller 200 not only causes the storing portion 220 to store this information but also executes, on the basis of this information, an operation for adjusting the offset amount X to the second offset amount X2 in the above-described manner. Further, the controller 200 executes an operation for adjusting the penetration amount Y to the second penetration amount Y2 in synchronism with the operation for adjusting the offset amount X. Similarly, also, in the case where the determining portion 503 is operated in the state in which the "DOWNSTREAM (RECOMMENDED PAPER: THICK PAPER)" is selected at the offset amount selecting portion 502, the offset amount X is adjusted to the above-described first offset amount X1, and in synchronism therewith, the penetration amount Y is adjusted to the first penetration amount Y1. Further, the canceling portion (cancel button) 504 is operated, so that an operation after calling up a current offset amount operating screen 500 is canceled. By this, even when an operation for changing the offset amount X is performed, the operation for adjusting the offset amount X (and the operation for adjusting the penetration amount Y) are not performed. Incidentally, a similarly as in the case of the embodiment 2, a constitution in which in the case where the determining portion 503 or the canceling portion 504 is operated, the offset amount operating screen 500 is closed may also be employed.

As shown in part (b) of FIG. 14, the penetration amount operating screen 300 in this embodiment is similar to the operating screen 300 (FIG. 5) in the embodiment 1. However, as described above, in this embodiment, the restriction is put on the adjustment of the penetration amount Y depending on the offset amount X.

For example, in the case where the "UPSTREAM" is selected on the offset amount operating screen 500, as defaults, the offset amount X and the penetration amount Y are set at the second offset amount X2=+2.5 mm and the second penetration amount Y2=0 mm (spaced). In this case, in the constitution of this embodiment, when the penetration amount Y is adjusted to a + (positive) side (penetration amount Y: increase) and thus is made large, the contact distance D becomes large, so that the "roughness" occurs in some instances. For that reason, in this embodiment, in the case where the offset amount X is the second offset amount X2=2.5 mm, an instruction of an adjusting amount of the penetration amount Y is disabled. Specifically, the controller 200 does not carry out control of operating the urging mechanism 16 even when on the penetration amount operating screen 300, an adjusting value for making the penetration amount Y larger than 0 mm (spaced) is inputted. Incidentally, in the constitution in which when the adjusting amount of the penetration amount Y toward the +side is large, the "roughness" occurs in some instances, an instruction of an adjusting amount in which the penetration amount Y becomes larger than a predetermined threshold larger than 0 mm may also be disabled.

Further, for example, in the case where the "DOWNSTREAM" is selected on the offset amount operating screen 500, as defaults, the offset amount X and the penetration amount Y are set at the first offset amount X1=−1.3 mm and the first penetration amount Y1=1.5 mm, respectively. In this case, by adjusting the penetration amount Y to the +side (penetration amount Y: increase), for example, an occurrence of the image defect such as the "shock image" at the leading end and the trailing end of the high-rigidity recording material P can be more easily suppressed in some instances. Further, in this case, by adjusting the penetration amount Y to a − (negative) side (penetration amount Y: decrease), the "roughness" can be more easily suppressed in some instances. However, in the constitution of this embodiment, when the adjusting amount of the penetration amount Y toward the −side is large, the urging member 26 and the inner roller 21 contact each other, so that there is a possibility that members such as the inner roller 21 and the urging member 26 are damaged and that a lifetime of each of the members lowers. For that reason, in this embodiment, in the case where the offset amount X is the first offset amount X1=−1.3 mm, an instruction of an adjusting amount in which the penetration amount Y becomes smaller than a predetermined threshold (for example, the penetration amount Y=0.5 mm) is disabled. Specifically, the controller 200 does not carry out control of operating the urging mechanism 16 even when on the penetration amount operating screen 300, an adjusting value for making the penetration amount Y smaller than a predetermined threshold (for example, the penetration amount Y=0.5 mm) is inputted. Incidentally, at this time, the controller 200 may also carry out control of operating the urging mechanism 16 so that the penetration amount Y becomes the penetration amount Y=0.5 mm as a minimum value corresponding to the first offset amount X1.

8. Modified Embodiments

In the above-described embodiment shown in FIG. 14, in the case where the "UPSTREAM" is selected on the offset amount operating screen 500, even when the adjusting amount for the penetration amount Y is inputted on the penetration amount operating screen 300, the instruction of the adjusting amount is disabled. Further, in the embodiment of FIG. 14, in the case where the "DOWNSTREAM" is selected on the offset amount operating screen 500, even when the adjusting amount for the penetration amount Y smaller than the predetermined threshold (for example, the penetration amount Y=0.5 mm) is inputted on the penetration amount operating screen 300, the instruction of the adjusting amount is disabled.

Parts (a-1), (a-2), (b-1) and (b-2) of FIG. 14 are schematic views showing modified embodiments of the offset amount operating screen 500 and the penetration amount operating screen 300 which are displayed at the operating portion 101 in this embodiment. On the offset amount operating screen 500 and the penetration amount operating screen 300 in FIG. 15, elements having functions similar to those on the offset amount operating screen 500 and the penetration amount operating screen 300 in FIG. 14 are represented by the same reference numerals or symbols. In the modified embodiments shown in FIG. 15, from the above-described viewpoints of the image defects and damage of the members, adjustment on the penetration amount operating screen 300 is disabled, attention to the user is aroused on the penetration amount operating screen 300, or both of these are carried out.

For example, as shown in part (a-1) of FIG. 15, in the case where the "UPSTREAM" is selected on the offset amount operating screen 500, as the defaults, the offset amount X and the penetration amount Y are set at the second offset amount X2=+2.5 mm and the second penetration amount Y2=0 mm (spaced), respectively. In this case, when the adjusting amount of the penetration amount Y toward the +side (penetration amount Y: increase) is large, the contact distance D becomes large, so that the "roughness" occurs in some cases. For that reason, in this modified embodiment, in the case where an adjusting value for making the penetration amount Y larger than a predetermined threshold is inputted at the adjusting value input portion 303, as shown in part (a-2) of FIG. 15, at a warning display portion 306 of the penetration amount operating screen 300, for example, "*THERE IS A POSSIBILITY THAT IMAGE QUALITY BECOMES POOR" or the like is displayed, so that attention to the user is aroused. Further, in addition thereto or in place thereof, the adjusting value for making the penetration amount Y larger than the predetermined threshold can be made unable to be inputted at the adjusting value input portion 303. Incidentally, in the constitution in which when the penetration amount Y is adjusted to the +side and thus is made larger than 0 mm, the "roughness" occurs, in the case where the input of the adjusting value for making the penetration amount Y larger than 0 mm is carried out, the attention to the user may be aroused or the input may also be disabled.

Further, for example, as shown in part (b-1) of FIG. 15, in the case where the "DOWNSTREAM" is selected on the offset amount operating screen 500, as the defaults, the offset amount X and the penetration amount Y are set at the second offset amount X1=−1.3 mm and the second penetration amount Y1=1.5 mm, respectively. In this case, when the adjusting amount of the penetration amount Y toward the −side is large, the urging member 26 and the inner roller 21 contact each other, so that there is a possibility of damage and lowering in lifetime of members such as the inner roller 21 and the urging member 26. For that reason, in this modified embodiment, in the case where an adjusting value for making the penetration amount Y smaller than a predetermined threshold (for example, penetration amount X=0.5 mm) is inputted at the adjusting value input portion 303, the following operation is performed. That is, as shown in part (b-2) of FIG. 15, at a warning display portion 306 of the penetration amount operating screen 300, for example, "*UNADJUSTABLE ANYMORE" or the like is displayed, so that attention to the user is aroused. Further, in addition thereto or in place thereof, the adjusting value for making the penetration amount Y smaller than the predetermined threshold (for example, the penetration amount Y=0.5 mm) can be made unable to be inputted at the adjusting value input portion 303.

Incidentally, in this embodiment, the case where the offset amount X is changeable to the first offset amount X1 and the second offset amount X2 was described as an example, but may also be arbitrarily changeable with a predetermined change range similarly as in the embodiment 2. Also, in this case, similarly as in this embodiment, the restriction can be put on the adjustment of the penetration amount Y depending on the offset amount X. However, a value (range) of the offset amount in which there is no restriction on the adjustment of the penetration amount Y may also be provided. For example, in the case where the offset amount X is set at a value which is a first predetermined value or less, it is possible to put restrictions (disablement of adjustment, input restriction of adjustment instruction, calling for attention, and the like) on decrease in penetration amount Y so as to be made smaller than the first threshold. Further, in the case where the offset amount X is set at a value which is not less than a second threshold larger than the first threshold, it is possible to put the above-described restrictions on increase in penetration amount Y so as to be made larger than the second threshold which is not more than the first threshold. Further, in the case where the offset amount X is set at a value which is larger than the above-described first predetermined value and which is smaller than the above-described second predetermined value, the penetration amount Y is made freely settable in a changeable range.

Further, in this embodiment, on the basis of the offset amount X, the restrictions were put on the adjustment of the penetration amount Y depending on the offset amount X. Reversely, on the basis of the penetration amount Y, the restrictions may also be put on the adjustment of the offset amount X depending on the penetration amount Y.

9. Effect

As described above, the image forming apparatus 100 of this embodiment includes the first position changing mechanism (offset mechanism) 17, the second position changing mechanism (urging mechanism) 16, the controller 200 for controlling the first position changing mechanism 17 and the second position changing mechanism 16, and the input portions 300 and 500 for permitting input of instructions to the controller 200. Further, in this embodiment, the controller 200 is capable of executing not only control of changing the above-described relative position and the above-described position of the urging member 26 by operating the first position changing mechanism 17 and the second position changing mechanism 16 depending on the instructions on the adjustments of the relative position and the position of the urging member 26 inputted from the input portions by the operation of the operator, but also at least one of a process of restricting the adjustment of the position of the urging member 26 depending on the relative position and a process of restricting the adjustment of the relative position depending on the position of the urging member 26. Specifically, the image forming apparatus 100 includes the storing portion 220 for storing the setting of the above-described relative position and the setting of the position of the urging member 26, which are determined in advance for every kind of the recording material P, when the toner image is transferred onto the recording material P of each of the kinds. Further, the controller 200 is capable of not only changing each of the setting of the above-described relative position and the setting of the position of the urging member 26 which are stored in the storing portion 220 and determined in advance for every kind of the above-described recording material P, by the input from the associated input portion through the operation by the operator, but also executing at least one of a process of restricting a change in position of the urging member 26 relative to a kind of the recording material P depending on the above-described relative position set for the kind of the recording material P and a process of restricting a change in the above-described relative position relative to the kind of the recording material P depending on the position of the urging member 26 set for the kind of the recording material P. In this embodiment, each of the input portions 300 and 500 includes the operating portion 101 provided on the image forming apparatus 100 and operated by the operator.

Here, the above-described restricting processes are at least one of processes in which the instruction inputted from the input portion by the operation of the operator is not reflected on the above-described setting, in which a range of an instruction capable of being inputted from the input portion by the operation of the operator is restricted, and in which warning is provided to the operator. Further, in this embodiment, the controller 200 executes a process of restricting the change in setting of the position of the urging member 26. Specifically, in the case where the relative position set for the kind of the recording material P is the first relative position, the controller 200 executes a process of restricting that the setting of the position of the urging member 26 is changed so that the above-described urging amount is smaller than a first threshold. In the case where the relative position set for the kind of the recording material P is the second relative position where the inner roller 21 is positioned further downstream of the outer roller 9 with respect to the rotational direction of the belt 7 than that at the first relative position, the controller 200 executes a different process. Further, in this embodiment, the first position changing mechanism 17 changes the relative position by changing the position of the inner roller 21.

Thus, in this embodiment, depending on the offset amount X, the restrictions (disablement of adjustment, input restriction on adjust instruction, calling for attention, and the like) are put on the adjustment of the penetration amount Y. By this, it is possible to enable the adjustments of the offset amount X and the penetration amount Y corresponding the recording material P actually used by the user and the image formed while suppressing the occurrence of the image defect, damage on the members, and the like.

Other Embodiments

The present invention was described above based on specific embodiments, but is not limited thereto.

In the above-described embodiments, the constitution in which the offset amount is changed by changing the position of the inner roller is employed, but a constitution in which the offset amount changed by changing the position of the outer roller may also be employed. Further, the present invention is not limited to a constitution in which either one of the inner roller and the outer roller is moved, but may also employ a constitution in which the offset amount is changed by moving both the inner roller and the outer roller.

In the above-described embodiments, as an outer member for forming the secondary transfer nip in cooperation with the inner roller as an inner member, the outer roller directly contacting the outer peripheral surface of the intermediary transfer belt was used. On the other hand, a constitution in which as the outer member, the outer roller and a secondary transfer belt stretched by the outer roller and other rollers are used may also be employed. That is, the image forming apparatus may include, as the outer member, the stretching rollers, the outer roller and the secondary transfer belt stretched between these rollers. Further, the secondary transfer roller is contacted to the outer peripheral surface of the intermediary transfer belt by the outer roller. In such a constitution, by the inner roller contacting the inner peripheral surface of the intermediary transfer belt and the outer roller contacting the inner peripheral surface of the secondary transfer belt, the intermediary transfer belt and the secondary transfer belt are sandwiched, so that the secondary transfer nip is formed. In this case, a contact portion between the intermediary transfer belt and the secondary transfer belt is the secondary transfer nip as the secondary transfer portion. Incidentally, also in this case, the offset amount X is defined by the relative position between the inner roller and the outer roller similarly as described above. Further, the penetration amount Y is also defined similarly as described above by using the reference line L1 formed by the inner roller and the pre-secondary transfer roller and the urging portion tangential line L4 or by using the reference line L formed by the outer roller and the pre-secondary transfer roller and the urging portion tangential line L4'.

In the above-described embodiments, the information on the kind of the recording material relating to the rigidity of the recording material was used, but the present invention is not limited thereto. In the case where a paper kind category (for example, plain paper and coated paper which are the paper kind categories based on a surface property) or a brand (including a manufacturer, a product number or the like) is the same, the basis weight of the recording material and the thickness of the recording material are in a substantially proportional relationship in many instances (in which the basis weight is larger with an increasing thickness). Further, in the case where the paper kind category or the brand is the same, the rigidity of the recording material and the basis weight or the thickness of the recording material are in a substantially proportional relationship in many instances (in which the rigidity is larger with an increasing basis weight or thickness). Accordingly, for example, the offset amount and the penetration amount can be set on the basis of the basis weight, the thickness or the rigidity of the recording material for each of the paper kind categories, the brands or combinations of the paper kind category and the brand. Further, the controller is capable of causing the offset mechanism and the urging mechanism to operate so as to provide the offset amount and the penetration amount, respectively, depending on the recording material, on the basis of information on the paper kind category, the brand and the like which are inputted from the operating portion and the external device and on the basis of the basis weight, the thickness, the rigidity and the like of the recording material. Further, the present invention is not limited to use of, as the information on the kind of the recording material, quantitative information on, for example, the basis weight, the thickness or the rigidity. As the information on the kind of the recording material, for example, only qualitative information on the paper kind category, the brand or a combination of the paper kind category and the brand can be used. For example, the offset amount can be set in advance depending on the paper kind category, the brand or a combination of the paper kind category and the brand. Then, the controller is capable of determining the offset amount and the penetration amount depending on the information on the paper kind category, the brand and the like which are inputted from the operating portion, the external device or the like. Also, in this case, each of the offset amount and the penetration amount is assigned on the basis of a difference in rigidity between the recording materials. Incidentally, the rigidity of the recording material can be represented by Gurley rigidity (stiffness) (MD/long fold) [mN] and can be measured by a commercially available Gurley stiffness tester.

In the above-described embodiments, description of the controller was made that the controller acquires the information on the kind of the recording material on the basis of the input thereof from the operating portion or the external device through the operation by the operator such as the user or the service person. On the other hand, the controller may also acquire the information on the kind of the recording material on the basis of the input of a detection result of the detecting means. For example, a basis weight sensor can be used as a basis weight detecting means for detecting an index value correlating with the basis weight of the recording material. As the basis weight sensor, for example, a basis weight sensor utilizing attenuation of ultrasonic wave has been known. This basis weight sensor includes an ultrasonic generating portion and an ultrasonic receiving portion which are provided so as to sandwich a recording material feeding passage. The basis weight sensor generates the ultrasonic wave from the ultrasonic generating portion and receives the ultrasonic wave attenuation by being passed through the recording material, and then on the basis of attenuation amount of the ultrasonic wave, detects the index value correlating with the basis weight of the recording material. Incidentally, the basis weight detecting means may only be required to be capable of detecting the index value correlating with the basis weight of the recording material and is not limited to the basis weight detecting means utilizing the ultrasonic wave, but may also be a basis weight detecting means utilizing light, for example. The index value correlating the basis weight of the recording material is not limited to the basis weight itself, but may also be a thickness corresponding to the basis weight. Further, a surface property sensor can be used as a smoothness detecting means for detecting an index value correlating with surface smoothness of the recording material capable of being utilized for detecting the paper kind category. As the surface property sensor, a regularly/irregularly reflected light sensor for reading intensity of regularly reflected light and irregularly reflected light by irradiating the recording material with light has been known. In the case where the surface of the recording material is smooth, the regularly reflected light becomes strong, and in the case where the surface of the recording material is rough, the irregularly reflected light becomes strong. For that reason, the surface property sensor is capable of detecting the index value corresponding with the smoothness of the recording material surface by measuring a regularly reflected light quantity and an irregularly reflected light quantity. Incidentally, the smoothness detecting means may only be required to be capable of detecting the index value correlating with the smoothness of the recording material surface and is not limited to the above-described smoothness detecting means using the light quantity sensor, but may also be a smoothness detecting means using, for example, an image-pick up element. The index correlating the smoothness of the recording material surface is not limited to a value converted to a value in conformity to a predetermined standard such as Bekk smoothness, but may only be required to be a value having a correlation with the smoothness of the recording material surface. These detecting means can be disposed adjacent to the recording material feeding passage on a side upstream of the recording material rollers with respect to the recording material feeding direction, for example. Further, for example, a detecting means (media sensor) may be constituted as a single unit including the above-described basis weight sensor, the surface property sensor, and the like.

In the above-described embodiments, as the offset mechanism and the urging mechanism, an actuator for actuating the movable portion by the cam was used, but the offset mechanism is not limited thereto. The offset mechanism and the urging mechanism may only be required to be capable of realizing an operation in conformity to each of the above-described embodiments, and for example, an actuator for actuating the movable portion by using a solenoid may be used.

Further, in the above-described embodiments, the case where the belt-shaped image bearing member was the intermediary transfer belt was described, but the present invention is applicable when an image bearing member constituted by an endless belt for feeding the toner image borne at the image forming position is used. Examples of such a belt-shaped image bearing member may include a photosensitive (member) belt and an electrostatic recording dielectric (member) belt, in addition to the intermediary transfer belt in the above-described embodiments.

Further, the present invention can be carried out also in other embodiments in which a part or all of the constitutions of the above-described embodiments are replaced with alternative constitutions thereof. Accordingly, when the image forming apparatus using the belt-shaped image bearing member is used, the present invention can be carried out with no distinction as to tandem type/single drum type, a charging type, an electrostatic image forming type, a developing type, a transfer type and a fixing type. In the above-described embodiments, a principal part relating to the toner image formation/transfer was described principally, but the present invention can be carried out in various uses, such as printers, various printing machines, copying machines, facsimile machines and multi-function machines, by adding necessary device, equipment and a casing structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-105702 filed on Jun. 18, 2020, which is hereby incorporated by reference herein in its entirety.

What is claimed:

1. An image forming apparatus comprising:

an image forming portion configured to form a toner image on an image bearing member;

a belt onto which the toner image is transferred from the image bearing member;

a plurality of stretching rollers including an inner roller contacting an inner peripheral surface of said belt and an upstream roller provided upstream of and adjacent to said inner roller with respect to a rotational direction of said belt, said stretching rollers being configured to stretch said belt;

an outer member configured to form a transfer nip, where the toner image is transferred from said belt onto a recording material, in cooperation with said inner roller, said outer member being in contact with an outer peripheral surface of said belt;

an urging member provided downstream of said upstream roller and upstream of said inner roller with respect to the rotational direction of said belt and capable of urging the inner peripheral surface of said belt;

a position changing mechanism configured to change a position of said urging member;

a storing portion configured to store setting information for setting a position of said urging member corresponding to a kind of a recording material;

a controller configured to control said position changing mechanism on the basis of the kind of the recording material on which the image is formed and the setting information stored in said storing portion; and an operating portion configured to allow manual input of an instruction to change the position of said urging member corresponding to a predetermined recording material.

2. The image forming apparatus according to claim 1, wherein said position changing mechanism is a first position changing mechanism, wherein said image forming apparatus further comprises a second position changing mechanism configured to change a position of the transfer nip with respect to a circumferential direction of said inner roller by moving said inner roller, wherein the setting information is first setting information, and said storing portion stores second setting information for setting a position of said inner roller corresponding to the kind of the recording material, and wherein said operating portion is configured to allow manual input of an instruction to change the position of said inner roller corresponding to the predetermined recording material.

3. The image forming apparatus according to claim 2, wherein said second position changing mechanism is capable of changing the position of said inner roller among a plurality of positions including a first transfer position and a second transfer position positioned downstream of the first transfer position with respect to the rotational direction of said belt, wherein said urging member is configured to be contactable to and spaced from said belt, and wherein in a case that the position of said inner roller corresponding to the predetermined recording material is set to the second transfer position, input of the instruction from said operating portion to change the position of said urging member corresponding to the predetermined recording material so as to cause said urging member to contact said belt is disabled, or the instruction input from said operating portion to change the position of said urging member corresponding to the predetermined recording material so as to cause said urging member to contact said belt is disabled.

4. The image forming apparatus according to claim 3, wherein in a case that the position of said inner roller corresponding to the predetermined recording material is set to the first transfer position, input of the instruction from said operating portion to change the position of said urging member corresponding to the predetermined recording material so as to cause said urging member to be spaced from said belt is disabled, or the instruction input from said operating portion to change the position of said urging member corresponding to the predetermined recording material so as to cause said urging member to be spaced from said belt is disabled.

5. The image forming apparatus according to claim 2, wherein when the position of said inner roller corresponding to the predetermined recording material is changed through said operating portion, the position of said urging member corresponding to the predetermined recording material is changed on the basis of the change of the position of said inner roller corresponding to the predetermined recording material.

6. The image forming apparatus according to claim 5, wherein said second position changing mechanism is capable of changing the position of said inner roller among a plurality of positions including a first position and a second position positioned downstream of the first position with respect to the rotational direction of said belt, and wherein when the position of said urging member corresponding to the predetermined recording material is set to the position in contact with said belt and the setting of the position of said inner roller corresponding to the predetermined recording material is changed through said operating portion from the first transfer position to the second transfer position, the position of said urging member corresponding to the predetermined recording material is changed from the position in contact with said belt to the position spaced from said belt.

7. The image forming apparatus according to claim 1, wherein said position changing mechanism changes at least one of an urging amount of said urging member against said belt and a state in which said urging member is contacted to or spaced from said belt.

8. The image forming apparatus according to claim 1, wherein said outer member is a roller member or an endless belt member.

9. The image forming apparatus according to claim 1, further comprising a guiding member provided upstream of the transfer nip with respect to a recording material feeding direction and configured to guide the recording material to the transfer nip.

10. An image forming apparatus comprising:

an image forming portion configured to form a toner image on an image bearing member;

a belt onto which the toner image is transferred from the image bearing member;

a plurality of stretching rollers including an inner roller contacting an inner peripheral surface of said belt, said stretching rollers being configured to stretch said belt;

an outer member configured to form a transfer nip, where the toner image is transferred from said belt onto a recording material, in cooperation with said inner roller, said outer member being in contact with an outer peripheral surface of said belt;

a position changing mechanism configured to change a position of the transfer nip with respect to a circumferential direction of said inner roller by moving said inner roller;

a storing portion configured to store setting information for setting a position of said inner roller corresponding to a kind of a recording material;

a controller configured to control said position changing mechanism on the basis of the kind of the recording material on which the image is formed and the setting information stored in said storing portion; and an operating portion configured to allow manual input of an instruction to change the position of said inner roller corresponding to the predetermined recording material.

11. The image forming apparatus according to claim 10, wherein said position changing mechanism is capable of changing the position of said inner roller among a plurality of positions including a first transfer position and a second transfer position positioned downstream of the first transfer position with respect to a rotational direction of said belt, wherein said controller is configured to acquire information on a basis weight of the recording material on which the image is formed, and wherein in a case that said controller acquires the information that indicates the basis weight of the recording material is less than a predetermined value, said image forming apparatus is configured to be incapable of changing the position of said inner roller to the second transfer position by an operation through said operating portion.

12. An image forming apparatus comprising:

an image bearing member configured to bear a toner image;

a transfer member configured to form a transfer portion between said transfer member and said image bearing member, the toner image being transferred from said image bearing member at the transfer portion;

a position changing mechanism configured to change a position of the transfer portion with respect to a circumferential direction of said image bearing member by moving said transfer member;

a receiving portion configured to receive information on a kind of a recording material on which an image is formed;

a controller configured to control an image forming operation based on the information; and an operating portion configured to allow manual input of an instruction, wherein said controller is configured to be capable of selectively executing the image forming operation in a first mode and a second mode, in the first mode, the position of the transfer portion with respect to the circumferential direction of said image bearing member being changed to any one of a plurality of positions including a first position and a second position based on the information received by said receiving portion, and in the second mode, the position of the transfer portion with respect to the circumferential direction of said image bearing member being changed to any one of the plurality of positions including the first position and the second position based on the instruction manually inputted through said operating portion regardless of the information received by said receiving portion.

13. The image forming apparatus according to claim 12, wherein a storing portion is configured to store setting information for setting a position of said transfer member corresponding to a kind of the recording material, and in the first mode, said controller controls the position of the transfer portion with respect to the circumferential direction of said image bearing member based on the information received by said receiving portion and the setting information stored in said storing portion.

14. The image forming apparatus according to claim 12, wherein said position changing mechanism changes the position of the transfer portion, with respect to the circumferential direction of said image bearing member, to either of the first position and the second position based on the information received by said receiving portion.

15. The image forming apparatus according to claim 14, wherein in a case that said receiving portion receives information indicating that the kind of the recording material on which an image is formed is a predetermined recording material, when the image forming operation is executed in the first mode, the position of the transfer portion with respect to the circumferential direction of said image bearing member is the first position, and when the image forming operation is executed in the second mode, the position of the transfer portion with respect to the circumferential direction of said image bearing member is the first position or the second position.

16. The image forming apparatus according to claim 15, wherein said controller is configured to be capable of controlling a setting condition of a second object different from a first object, which is the position of the transfer portion with respect to the circumferential direction of said image bearing member, based on the instruction inputted through said operating portion, and wherein, when the image forming operation is executed in the second mode, the second object is set to a first setting condition in a case in which the position of the transfer portion with respect to the circumferential direction of said image bearing member is set to the first position, and the second object is set to a second setting condition in a case in which the position of the transfer portion with respect to the circumferential direction of said image bearing member is set to the second position.

17. The image forming apparatus according to claim 12, further comprising a power source configured to supply electric power, wherein said controller is configured to control said power source based on the information received by said receiving portion.

18. An image forming apparatus comprising:

an image bearing member configured to bear a toner image;

a transfer member configured to form a transfer portion between said transfer member and said image bearing member, the toner image being transferred from said image bearing member at the transfer portion;

a position changing mechanism configured to change a position of the transfer portion with respect to a circumferential direction of said image bearing member by moving said transfer member;

a receiving portion configured to receive information on a kind of a recording material on which an image is formed;

a controller configured to control an image forming operation based on the information received by said receiving portion; and an operating portion configured to allow manual input of an instruction, wherein said controller is configured to be capable of selectively executing the image forming operation in a first mode and a second mode, in the first mode, the position of the transfer portion with respect to the circumferential direction of said image bearing member being changed to any one of a plurality of positions including a first position and a second position based on the information received by said receiving portion, and in the second mode, the position of the transfer portion with respect to the circumferential direction of said image bearing member being changed to a position based on the instruction manually inputted through said operating portion regardless of the information received by said receiving portion.

19. The image forming apparatus according to claim 18, wherein, when the information is first information, a storing portion is configured to store second information for setting a position of said transfer member determined correspondingly to the first information, and in the first mode, said controller controls the position of the transfer portion with respect to the circumferential direction of said image bearing member based on the first information received by said receiving portion and the second information stored in said storing portion during image formation.

20. The image forming apparatus according to claim 18, wherein said position changing mechanism changes the position of the transfer portion, with respect to the circumferential direction of said image bearing member, to either of the first position and the second position based on the information received by said receiving portion.

21. The image forming apparatus according to claim 20, wherein in a case that said receiving portion receives information indicating that the kind of the recording material on which an image is formed is a predetermined recording material, when the image forming operation is executed in the first mode, the position of the transfer portion with respect to the circumferential direction of said image bearing member is the first position, and when the image forming operation is executed in the second mode, the position of the transfer portion with respect to the circumferential direction of said image bearing member is the first position or the second position.

22. The image forming apparatus according to claim 21, wherein said controller is configured to be capable of controlling a setting condition of a second object different from a first object, which is the position of the transfer portion with respect to the circumferential direction of said image bearing member, based on the instruction inputted through said operating portion, and wherein, when the image forming operation is executed in the second mode, the second object is set to a first setting condition in a case in which the position of the transfer portion with respect to the circumferential direction of said image bearing member is set to the first position, and the second object is set to a second setting condition in a case in which the position of the transfer portion with respect to the circumferential direction of said image bearing member is set to the second position.

23. The image forming apparatus according to claim 18, further comprising a power source configured to supply electric power, wherein said controller is configured to control said power source based on the information received by said receiving portion.

24. An image forming apparatus comprising:

an image forming portion configured to form a toner image on an image bearing member;

a belt onto which the toner image is transferred from the image bearing member;

a transfer member configured to form a transfer portion and configured to transfer the toner image from said belt to a recording material at the transfer portion;

a position changing mechanism configured to change a position of the transfer portion with respect to a circumferential direction of said belt by moving said transfer member;

a receiving portion configured to receive information on a kind of the recording material on which an image is formed;

a controller configured to control an image forming operation based on the information received by said receiving portion; and an operating portion configured to allow manual input of an instruction, wherein said controller is configured to be capable of selectively executing the image forming operation in a first mode and a second mode, in the first mode, the position of the transfer portion with respect to the circumferential direction of said belt being changed to any one of a plurality of positions including a first position and a second position based on the information received by said receiving portion, and in the second mode, the position of the transfer portion with respect to the circumferential direction of said belt being changed based on the instruction manually inputted through said operating portion regardless of the information received by said receiving portion.

25. The image forming apparatus according to claim 24, wherein, when the information is first information, a storing portion is configured to store second information for setting a position of said transfer member determined correspondingly to the first information, and in the first mode, said controller controls the position of the transfer portion with respect to the circumferential direction of said belt based on the first information received by said receiving portion and the second information stored in said storing portion.

26. The image forming apparatus according to claim 25, wherein said position changing mechanism changes the position of the transfer portion, with respect to the circumferential direction of said belt, to either of the first position and the second position based on the information received by said receiving portion.

27. The image forming apparatus according to claim 26, wherein in a case in which the kind of the recording material on which the image is formed is received as a predetermined kind by said receiving portion, when the image forming operation is executed in the first mode, the position of the transfer portion with respect to the circumferential direction of said belt is the first position, and when the image forming operation is executed in the second mode, the position of the transfer portion with respect to the circumferential direction of said belt is the first position or the second position.

28. The image forming apparatus according to claim 27, wherein said controller is configured to be capable of controlling a setting condition of a second object different from a first object, which is the position of the transfer portion with respect to the circumferential direction of said belt, based on the instruction inputted through said operating portion, and wherein, when the image forming operation is executed in the second mode, the second object is set to a first setting condition in a case in which the position of the transfer portion with respect to the circumferential direction of said belt is set to the first position, and the second object is set to a second setting condition in a case in which the position of the transfer portion with respect to the circumferential direction of said belt is set to the second position.

29. The image forming apparatus according to claim 24, further comprising a power source configured to supply electric power, wherein said controller is configured to control said power source based on the information received by said receiving portion.

* * * * *